(12) United States Patent
Lunacek et al.

(10) Patent No.: US 9,081,393 B2
(45) Date of Patent: Jul. 14, 2015

(54) THERMOSTAT WITH ELECTRONIC IMAGE DISPLAY

(71) Applicant: Honeywell International, Inc., Morristown, NJ (US)

(72) Inventors: Michael G. Lunacek, Rogers, MN (US); John B. Amundson, Minneapolis, MN (US); Robert D. Juntunen, Minnetonka, MN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 14/047,825

(22) Filed: Oct. 7, 2013

(65) Prior Publication Data

US 2014/0025209 A1 Jan. 23, 2014

Related U.S. Application Data

(63) Continuation of application No. 11/840,290, filed on Aug. 17, 2007, now Pat. No. 8,554,374, which is a continuation-in-part of application No. 11/752,816, filed on May 23, 2007, now Pat. No. 7,801,646, which is a continuation of application No. 10/726,243, filed on Dec. 2, 2003, now Pat. No. 7,225,054.

(51) Int. Cl.
*G05D 23/19* (2006.01)
(52) U.S. Cl.
CPC .................................. *G05D 23/1902* (2013.01)
(58) Field of Classification Search
None
See application file for complete search history.

(56) References Cited

U.S. PATENT DOCUMENTS

| | | | |
|---|---|---|---|
| 4,079,366 A | 3/1978 | Wong | |
| 4,174,807 A | 11/1979 | Smith et al. | |
| 4,206,872 A | 6/1980 | Levine | |
| 4,224,615 A | 9/1980 | Penz et al. | |
| 4,264,034 A | 4/1981 | Hyltin et al. | |
| 4,298,946 A | 11/1981 | Hartsell et al. | |
| 4,308,991 A | 1/1982 | Peinetti et al. | |
| 4,337,822 A | 7/1982 | Hyltin et al. | |
| 4,382,544 A | 5/1983 | Stewart et al. | |
| 4,386,649 A | 6/1983 | Hines et al. | |
| 4,388,692 A | 6/1983 | Jones et al. | |

(Continued)

FOREIGN PATENT DOCUMENTS

| | | |
|---|---|---|
| DE | 3334117 | 4/1985 |
| EP | 0434926 | 8/1995 |

(Continued)

OTHER PUBLICATIONS

Totaline, "Instructions P/N P474-1010", Manual, 2 pages, Dec. 1998.

(Continued)

*Primary Examiner* — Sean Shechtman
(74) *Attorney, Agent, or Firm* — Seager Tufte & Wickhem LLC.

(57) ABSTRACT

A programmable controller for homes and/or buildings and their related grounds, such as thermostat, that has a display and an external interface. The external interface may be use for uploading electronic images and/or other information from an external data source, and may use the uploaded electronic images and/or other information for programming and/or updating the controller and/or for viewing the electronic images and/or other information on the display of the controller.

21 Claims, 22 Drawing Sheets

(56) References Cited

U.S. PATENT DOCUMENTS

| | | |
|---|---|---|
| 4,431,134 A | 2/1984 | Hendricks et al. |
| 4,442,972 A | 4/1984 | Sahay et al. |
| 4,446,913 A | 5/1984 | Krocker et al. |
| 4,479,604 A | 10/1984 | Didner et al. |
| 4,506,827 A | 3/1985 | Jamieson et al. |
| 4,606,401 A | 8/1986 | Levine et al. |
| 4,621,336 A | 11/1986 | Brown |
| 4,622,544 A | 11/1986 | Bially et al. |
| 4,717,333 A | 1/1988 | Carignan |
| 4,725,001 A | 2/1988 | Carney et al. |
| 4,819,714 A | 4/1989 | Otsuka et al. |
| 4,837,731 A | 6/1989 | Levine et al. |
| 4,881,686 A | 11/1989 | Mehta |
| 4,918,439 A | 4/1990 | Wozniak et al. |
| 4,948,040 A | 8/1990 | Kobayashi et al. |
| 4,992,779 A | 2/1991 | Sugino et al. |
| 4,997,029 A | 3/1991 | Otsuka et al. |
| 5,012,973 A | 5/1991 | Dick et al. |
| 5,038,851 A | 8/1991 | Mehta |
| 5,053,752 A | 10/1991 | Epstein et al. |
| 5,065,813 A | 11/1991 | Berkeley et al. |
| 5,086,385 A | 2/1992 | Launey et al. |
| 5,088,645 A | 2/1992 | Bell |
| 5,140,310 A | 8/1992 | DeLuca et al. |
| 5,161,606 A | 11/1992 | Berkeley et al. |
| 5,170,935 A | 12/1992 | Federspiel et al. |
| 5,181,653 A | 1/1993 | Foster et al. |
| 5,230,482 A | 7/1993 | Ratz et al. |
| 5,238,184 A | 8/1993 | Adams |
| 5,251,813 A | 10/1993 | Kniepkamp |
| 5,259,445 A | 11/1993 | Pratt et al. |
| 5,326,027 A * | 7/1994 | Sulfstede ............... 236/51 |
| 5,329,991 A | 7/1994 | Mehta et al. |
| 5,348,078 A | 9/1994 | Dushane et al. |
| 5,386,577 A | 1/1995 | Zenda et al. |
| 5,395,042 A | 3/1995 | Riley et al. |
| 5,476,221 A * | 12/1995 | Seymour ............... 236/47 |
| 5,482,209 A | 1/1996 | Cochran |
| 5,526,422 A | 6/1996 | Keen |
| 5,537,106 A | 7/1996 | Mitsuhashi et al. |
| 5,566,879 A | 10/1996 | Longtin et al. |
| 5,570,837 A | 11/1996 | Brown et al. |
| 5,673,850 A | 10/1997 | Uptegraph et al. |
| 5,682,206 A | 10/1997 | Wehmeyer et al. |
| 5,782,296 A | 7/1998 | Mehta |
| 5,796,945 A * | 8/1998 | Tarabella ............... 709/219 |
| 5,818,428 A | 10/1998 | Eisenbrandt et al. |
| 5,833,134 A * | 11/1998 | Ho et al. ............... 236/49.3 |
| 5,841,112 A | 11/1998 | Brooks et al. |
| 5,873,519 A | 2/1999 | Beilfuss |
| 5,877,957 A | 3/1999 | Bennett |
| 5,886,697 A | 3/1999 | Naughton et al. |
| 5,901,183 A | 5/1999 | Garin et al. |
| 5,902,183 A | 5/1999 | D'Souza et al. |
| 5,937,942 A | 8/1999 | Bias et al. |
| 5,947,372 A | 9/1999 | Tiernan |
| 6,020,881 A | 2/2000 | Naughton et al. |
| 6,032,867 A | 3/2000 | Dushane et al. |
| 6,059,195 A | 5/2000 | Adams et al. |
| 6,064,310 A | 5/2000 | Busak et al. |
| 6,081,197 A | 6/2000 | Garrick et al. |
| 6,121,875 A | 9/2000 | Hamm et al. |
| 6,140,987 A | 10/2000 | Stein et al. |
| 6,192,282 B1 | 2/2001 | Smith et al. |
| 6,196,467 B1 | 3/2001 | Dushane et al. |
| 6,208,331 B1 | 3/2001 | Singh et al. |
| 6,236,326 B1 | 5/2001 | Murphy |
| 6,259,074 B1 | 7/2001 | Brunner et al. |
| 6,285,912 B1 | 9/2001 | Ellison et al. |
| 6,290,140 B1 | 9/2001 | Pesko et al. |
| 6,315,211 B1 | 11/2001 | Sartain et al. |
| 6,318,639 B1 | 11/2001 | Toth |
| 6,330,806 B1 | 12/2001 | Beaverson et al. |
| 6,339,429 B1 | 1/2002 | Schug |
| 6,344,861 B1 | 2/2002 | Naughton et al. |
| 6,351,693 B1 | 2/2002 | Monie et al. |
| 6,366,832 B2 * | 4/2002 | Lomonaco et al. ........... 700/276 |
| 6,398,118 B1 | 6/2002 | Rosen et al. |
| 6,466,132 B1 | 10/2002 | Caronna et al. |
| 6,478,233 B1 | 11/2002 | Shah |
| 6,502,758 B2 | 1/2003 | Cottrell |
| 6,518,957 B1 | 2/2003 | Lehtinen et al. |
| 6,546,400 B1 * | 4/2003 | Aberson ............... 1/1 |
| 6,559,882 B1 | 5/2003 | Kerchner |
| 6,578,770 B1 | 6/2003 | Rosen |
| 6,580,950 B1 | 6/2003 | Johnson et al. |
| 6,581,846 B1 | 6/2003 | Rosen |
| 6,595,430 B1 | 7/2003 | Shah |
| 6,608,560 B2 | 8/2003 | Abrams |
| 6,619,555 B2 | 9/2003 | Rosen |
| 6,621,507 B1 | 9/2003 | Shah |
| 6,726,112 B1 | 4/2004 | Ho |
| 6,736,112 B2 | 5/2004 | Tsuyuki |
| 6,741,915 B2 | 5/2004 | Poth |
| 6,783,079 B2 | 8/2004 | Carey et al. |
| 6,786,421 B2 | 9/2004 | Rosen |
| 6,789,739 B2 | 9/2004 | Rosen |
| 6,824,069 B2 | 11/2004 | Rosen |
| 6,833,990 B2 | 12/2004 | LaCroix et al. |
| 6,842,721 B2 | 1/2005 | Kim |
| 6,851,621 B1 | 2/2005 | Wacker |
| 6,862,499 B1 | 3/2005 | Cretella et al. |
| 6,868,293 B1 | 3/2005 | Schurr |
| 6,967,565 B2 | 11/2005 | Lingemann |
| 7,000,849 B2 | 2/2006 | Ashworth et al. |
| 7,001,495 B2 | 2/2006 | Essalik et al. |
| 7,047,092 B2 | 5/2006 | Wimsatt |
| 7,050,026 B1 | 5/2006 | Rosen |
| 7,083,109 B2 | 8/2006 | Pouchak |
| 7,130,719 B2 | 10/2006 | Ehlers et al. |
| 7,146,253 B2 | 12/2006 | Hoog et al. |
| 7,152,806 B1 | 12/2006 | Rosen |
| 7,156,318 B1 | 1/2007 | Rosen |
| 7,225,054 B2 | 5/2007 | Amundson et al. |
| 7,232,075 B1 | 6/2007 | Rosen |
| 7,302,642 B2 | 11/2007 | Smith et al. |
| 7,801,646 B2 | 9/2010 | Amundson et al. |
| 8,554,374 B2 | 10/2013 | Lunacek et al. |
| 2001/0029585 A1 | 10/2001 | Simon et al. |
| 2001/0052459 A1 | 12/2001 | Essalik et al. |
| 2002/0075307 A1 * | 6/2002 | Alexander et al. ........... 345/760 |
| 2002/0082727 A1 | 6/2002 | Laflamme et al. |
| 2002/0092779 A1 | 7/2002 | Essalik |
| 2003/0034897 A1 | 2/2003 | Shamoon et al. |
| 2003/0034898 A1 | 2/2003 | Shamoon et al. |
| 2003/0150927 A1 | 8/2003 | Rosen |
| 2003/0195640 A1 | 10/2003 | Krocker et al. |
| 2004/0100481 A1 * | 5/2004 | Muoio et al. ........... 345/716 |
| 2004/0165010 A1 * | 8/2004 | Robertson et al. ........... 345/805 |
| 2004/0260427 A1 | 12/2004 | Wimsatt |
| 2006/0071086 A1 * | 4/2006 | Kates ............... 236/1 B |
| 2007/0057079 A1 | 3/2007 | Stark |
| 2007/0278320 A1 | 12/2007 | Lunacek et al. |

FOREIGN PATENT DOCUMENTS

| | | |
|---|---|---|
| EP | 0678204 | 3/2000 |
| EP | 0985994 | 3/2000 |
| EP | 1074009 | 7/2001 |
| JP | 1159846 | 6/1999 |
| WO | 9711448 | 3/1997 |
| WO | 9739392 | 10/1997 |
| WO | 0152515 | 7/2001 |
| WO | 0179952 | 10/2001 |
| WO | 0193779 | 12/2001 |

OTHER PUBLICATIONS

Totaline, "Programmable Thermostat", Homeowner's Guide, 27 pages, Dec. 1998.

WarmlyYours, "Model TH111GFCI-P (120 VAC)," Manual, pp. 1-4, prior to Jul. 7, 2004.

Westinghouse, DPF-0702 Widescreen Digital Photo Frame, User's Manual, 48 pages, prior to Aug. 17, 2007.

(56) References Cited

OTHER PUBLICATIONS

White-Rodgers Comfort-Set III Thermostat, pp. 1-44, prior to Jul. 7, 2004.
White-Rodgers Installation Instructions for Heating & Air Conditioning IF78 5/2 Day Programmable Thermostat, 7 pages, prior to Jul. 7, 2004.
White-Rodgers, "Installation Instructions for Heating & Air Conditioning IF72 5/2 Day Programmable Heat Pump Thermostat," 8 pages, prior to Jul. 7, 2004.
White-Rodgers, "Comfort-Set 90 Series Thermostat," Manual, pp. 1-24, prior to Jul. 7, 2004.
White-Rodgers, 1F80-240 "(for Heating Only systems) Programmable Electronic Digital Thermostat," Installation and Operation Instructions, 8 pages, prior to Jul. 7, 2004.
White-Rodgers, 1F80-241 "Programmable Electronic Digital Thermostat," Installation and Operation Instructions, 6 pages, prior to Jul. 7, 2004.
White-Rodgers, 1F80-261 "Programmable Electronic Digital Thermostat," Installation and Operation Instructions, 8 pages, prior to Jul. 7, 2004.
White-Rodgers, 1F81-261 "Programmable Electronic Digital Multi-Stage Thermostat," Installation and Operation Instructions, 8 pages, prior to Jul. 7, 2004.
White-Rodgers, 1F82-261 "Programmable Electronic Digital Heat Pump Thermostat," Installation and Operation Instructions, 8 pages, prior to Jul. 7, 2004.
www.icmcontrols.com, Simplecomfort, SC3000 Single Stage Heat/Single Stage Cool or Single Stage Heat Pump/Manual Changeover, 1 page, prior to Jul. 7, 2004.
www.icmcontrols.com, Simplecomfort, SC3001 Single Stage Heat/Single Stage Cool or Single Stage Heat Pump/Manual Changeover, 1 page, prior to Jul. 7, 2004.
www.icmcontrols.com, Simplecomfort, SC3006 Single Stage Heat/Single Stage Cool or Single Stage Heat Pump/Manual Changeover, 1 page, prior to Jul. 7, 2004.
www.icmcontrols.com, Simplecomfort, SC33201 2 Stage Heat Pump Manual Changeover, 1 page, prior to Jul. 7, 2004.
www.icmcontrols.com, Simplecomfort, SC3801 2 Stage Heat/2 Stage Cool 2 Stage Heat Pump/Audio Changeover, 1 page, prior to Jul. 7, 2004.
Honeywell, "Excel Building Supervisor-Integrated R7044 and FS90 Ver. 2.0," Operator Manual, 70 pages, Apr. 1995.
Trane, "System Programming, Tracer Summit Version 14, BMTW-SVP01D-EN," 623 pages, Sep. 2002.
Freudenthal et al., "Communicating extensive smart home functionality to users of all ages: the design of a mixed-initiative multimodal thermostat-interface," pp. 34-39, Mar. 12-13, 2001.
Gentex Corporation, HD135, 135° Fixed Temperature Heat Detector AC Pwered, 120V, 60Hz With Battery Backup, Installation Instructions—Owner's Information, pp. 1-5, Jun. 1, 1998.
Gentex Corporation, 9000 Series, Photoelectric Type Single Station/Multi-Station Smoke Alarms AC Powered With Battery Backup, Installation Instructions—Owner's Information, pp. 9-1 to 9-6, Jan. 1, 1993.
Honeywell News Release, "Honeywell's New Sysnet Facilities Integration System for Boiler Plant and Combustion Safety Processes," 4 pages, Dec. 15, 1995.
Honeywell, "Introduction of the S7350A Honeywell WebPad Information Appliance," Home and Building Control Bulletin, 2 pages, Aug. 29, 2000; Picture of WebPad Device with touch screen, 1 Page; and screen shots of WebPad Device, 4 pages.
Honeywell, "W7006A Home Controller Gateway User Guide," 31 pages, Jul. 2001.
http://www.cc.gatech.edu/computing/classes/cs6751-94—fall/groupc/climate-2/node1.html, "Contents," 53 sates, printed Sep. 20, 2004.
http://www.ritetemp.info/rtMenu—13.html, Rite Temp 8082, 8 pages, printed Jun. 20, 2003.
http://www.thermostatsales.com, Robertshaw, "9610 Digital Programmable Thermostat," 3 pages, printed Jun. 17, 2004.
http://www.thermostatsales.com, Robertshaw, "9700 Deluxe Programmable Thermostat" 3 pages, printed Jun. 17, 2004.
http://www.thermostatsales.com, Robertshaw, "9710 Deluxe Programmable Thermostat," 3 pages, printed Jun. 17, 2004.
http://www.thermostatsales.com, Robertshaw, "9720 Deluxe Programmable Thermostat," 3 pages, printed Jun. 17, 2004.
Hunter, "44200/44250," Owner's Manual, 32 pages, prior to Jul. 7, 2004.
Hunter, "44300/44350," Owner's Manual, 35 pages, prior to Jul. 7, 2004.
Hunter, "Auto Saver 550", Owner's Manual Model 44550, 44 pages, prior to Jul. 7, 2004.
Invensys™, "9700i 9701i 9715i 9720i Deluxe Programmable Thermostats," User's Manual, pp. 1-28, prior to Jul. 7, 2004.
Lux ELV1 Programmable Line Voltage Thermostat, Installation Instructions, 3 pages, prior to Jul. 7, 2004.
Lux TX500 Series Smart Temp Electronic Thermostat, 3 pages, prior to Jul. 7, 2004.
Lux, "511 Series Smart Temp Electronic Thermostat," Owner's Manual, 3 pages, prior to Jul. 7, 2004.
Lux, "600 Series Smart Temp Electronic Thermostat," Owner's Manual, 3 pages, prior to Jul. 7, 2004.
Lux, "602 Series Multi-Stage Programmable Thermostat," Owner's Manual, 2 pages, prior to Jul. 7, 2004.
Lux, "605/2110 Series Programmable Heat Pump Thermostat," Owner's Manual, 3 pages, prior to Jul. 7, 2004.
Lux, "700/9000 Series Smart Temp Electronic Thermostat," Owner's Manual, 3 pages, prior to Jul. 7, 2004.
Lux, "PSPH521 Series Programmable Heat Pump Thermostat," Owner's Manual, 3 pages, prior to Jul. 7, 2004.
Lux, "TX1500 Series Smart Temp Electronic Thermostat," Owner's Manual, 6 pages, prior to Jul. 7, 2004.
Proliphix, "Web Enabled IP Thermostats, Intelligent HVAC Control," Proliphix Inc., 2 pages, on or before Aug. 28, 2004.
Proliphix, "Web Enabled IP Thermostats, Ultimate in Energy Efficiency!," Proliphix Inc., 2 pages, on or before Aug. 28, 2004.
Ritetemp Operation 8029, 3 pages, Jun. 19, 2002.
Ritetemp Operation 8050, 5 pages, Jun. 26, 2002.
Totaline, "1 for All Programmable Digital Thermostat," Owner's Manual P/N P474-1050, 21 pages, Nov. 1998.
Totaline, "1 for All Programmable Digital Thermostat," Owner's Manual P/N P374-1100, 24 pages, Apr. 2001.
Totaline, "1 for All programmable Digital Thermostat," Owner's Manual P/N P374-1100FM, 23 pages, Nov. 1998.
Totaline, "Intellistat Combination Temperature and Humidity Control," Owner's Manual P/N P374-1600, 25 pages, Jun. 2001.
Totaline, "Programmable Thermostat Configurable for Advanced Heat Pump or Dual Fuel Operation," Owner's Manual P/N P374-1500, 24 pages, Jun. 1999.
"Spotlight on integrated systems," Custom Builder, V8, N2, p. 66(6), Mar.-Apr. 1993.
Carrier, "Programmable Dual Fuel Thermostats," Installation, Start-Up & Operating Instructions, pp. 1-12, Oct. 1998.
Lennox, "Network Control Panel (NCP)," User's Manual, 18 pages, Nov. 1999.
Lux TX9000 Installation, 3 pages, prior to Apr. 21, 2005.
Ritetemp Operation 8085, pp. 1-6, prior to Apr. 21, 2005.
Sealed Unit Parts Co., Inc., Supco & CTC Thermostats . . . loaded with features, designed for value!, 6 pages, prior to Apr. 21, 2005.
Totaline Star CPE230RF, Commercial Programmable Thermostat Wireless Transmitter, Owner's Manual, pp. 1-16, Oct. 1998.
Totaline Model P474-1035 Owner's Manual Programmable 5-2 Day Digital Thermostat, pp. 1-21, Apr. 2003.
Totaline Star P/N P474-0130 Non-Programmable Digital Thermostat Owner's Manual, pp. 1-22, prior to Apr. 21, 2005.
White-Rodgers 1F80-224 Programmable Electronic Digital Thermostat, Installation and Operation Instructions, 8 pages, prior to Apr. 21, 2005.
White-Rodgers Installation Instructions for Heating & Air Conditioning 1F78 Non-Programmable Thermostat, 6 pages, prior to Apr. 21, 2005.
White-Rodgers, Comfort-Set 90 Series Premium, 4 pages, prior to Apr. 21, 2005.

(56) References Cited

OTHER PUBLICATIONS

"CorAccess Systems/In Home," http://web.archive.org/web20011212084427/www.coraccess.com/home.html, 1 page, copyright 2001, printed Aug. 19, 2004.
"HAI Company Background," http://www.homeauto.com/AboutHAI/abouthai—main.htm, 2 pages, printed Aug. 19, 2004.
"High-tech options take hold in new homes—200-08-28—Dallas Business Journal," http://bizjournals.com/dallas/stories/2000/08/28/focus4, 3 pages, dated Aug. 28, 2000, printed Aug. 19, 2004.
"Home Toys Review—TouchLinc", http://www.hometoys.com/htinews/aug99/reviews/touchlinc/touchlinc.htm, 3 pages, dated Aug. 1999, printed Aug. 20, 2004.
"HTI News Release," http://www.hometoys.com/htinews/apr99/releases/ha101.htm, 3 pages, Apr. 1999.
"Mark of Excellence Award Finalist Announced," http://64.233.167.104/search?Q=cache:ciOA2YtYaBIJ:www.hometoys.com/releases/mar. . . , 6 pages, Leopard Touchscreen on p. 2, dated prior to Mar. 4, 2000, printed Aug. 20, 2004.
"Product Review—Philips Pronto Remote Control," http://hometheaterhifi.com/volume—6-2/philipsprontoremotecontrol.html, 5 pages, dated May 1999, printed Aug. 20, 2004.
"RC X10 Automation Forum: Control your Heating and Cooling System with Pronto(1/1)," http://www.remotecentral.com/cgi-bin/mboard/rc-x10/thread.cgi?12, 2 pages, dated Apr. 23, 1999, printed Aug. 20, 2004.
"Vantage Expands Controls for Audio/Video, HVAC and Security," http://www.hometoys.com/htinews/aug99/releases/vantage03.htm, 2 pages, dated Aug. 3, 1999, printed Aug. 20, 2004.
Adicon 2500, "The Automator," 4 pages, Oct.-Dec. 2000.
ADT Security Services, "iCenter Advanced User Interface 8142ADT," Installation and Setup Guide, 5 pages, May 2001; First Sale Feb. 2001.
Aube Technologies, Electronic Thermostat for Heating System Model TH135-01, 5 pages, Aug. 14, 2001.
Aube Technologies, TH140-28 Electronic Programmable Thermostat, Installation Instructions and User Guide, pp. 1-4, Jan. 22, 2004.
AutomatedBuildings.com Article—"Thin Client" Solutions, "Pressure, Air Flow, Temserature, Humidity & Valves," Dwyer Instruments, Inc., 5 pages, printed Sep. 20, 2004.
Blake et al., "Seng 310 Final Project Demo Program" Illustration, 3 pages, Apr. 6, 2001.
Blake et al., "Seng 310 Final Project" Report, dated Apr. 6, 2001.
BRK Electronics Maximum Protection Plus Ultimate Convenience Smoke Alarm, 24 pages, Sep. 2000.
BRK First Alert, User's Manual, Smoke and Fire Alarms, pp. 1-7, Nov. 2002.
Business Wire, "MicroTouch Specialty Products Group to Capitalize on Growing Market for Low-Cost Digital Matrix Touchscreens," p. 1174 (2 pages), Jan. 6, 1999.
Cardio Manual, available at http://www.secant.ca/En/Documentation/Cardio2é-Manual.pdf, Cardio Home Automation Inc., 55 pages, printed Sep. 28, 2004.
Cardio, by Secant; http://www.hometoys.com/htinews/apr98/reviews/cardio.htm, "HTINews Review," Feb. 1998, 5 pages, printed Sep. 14, 2004.
Carrier Microelectronic Programmable Thermostat Owner's Manual, pp. 1-24, May 1994.
Carrier TSTATCCRF01 Programmable Digital Thermostat, pp. 1-21, prior to Apr. 21, 2005.
Carrier, "Programmable Thermostats," Installation, Start-Up & Operating Instructions, pp. 1-16, Sep. 1998.
Carrier, "Thermidistat Control," Installation, Start-Up, and Operating Instructions, pp. 1-12, Aug. 1999.
Climatouch, User Manual, Climatouch CT03TSB Thermostat, Climatouch CT03TSHB Thermostat with Humidity Control, Outdoor UHF Temperature Transmitter 217S31, 19 pages, Printed Sep. 15, 2004.
CorAccess, "Companion 6," User Guide, pp. 1-20, Jun. 17, 2002.
Danfoss RT51/51RF & RT52/52RF User Instructions, 2 pages, Jun. 2004.
DeKoven et al., "Measuring Task Models in Designing Intelligent Products," 2 pages, Jan. 13-16, 2002.
Domotique Secant Home Automation—Web Page, available at http://www.secant.ca/En/Company/Default.asp, 1 page, printed Sep. 28, 2004.
Firex Smoke Alarm, Ionization Models AD, ADC Photoelectric Model Pad, 4 pages, prior to Apr. 21, 2005.

* cited by examiner

THERMOSTAT WITH ELECTRONIC IMAGE DISPLAY

This application is a continuation of co-pending U.S. patent application Ser. No. 11/840,290, filed Aug. 17, 2007, which is a continuation-in-part of U.S. patent application Ser. No. 11/752,816, filed, May 23, 2007, now U.S. Pat. No. 7,801,646, which is a continuation of U.S. patent application Ser. No. 10/726,243, filed Dec. 2, 2003, now U.S. Pat. No. 7,225,054.

FIELD OF THE INVENTION

The present invention relates generally to the field of programmable controllers for homes and/or buildings and their related grounds. More specifically, the present invention relates to such controllers with a display, and an I/O interface for uploading electronic images and/or other information for use by the controller and/or for viewing on the display of the controller.

BACKGROUND OF THE INVENTION

Controllers are used on a wide variety of devices and systems for controlling various functions in homes and/or buildings and their related grounds. Some controllers have schedule programming that modifies device parameters such as set points as a function of date and/or time. Some such device or system controllers that utilize schedule programming for controlling various functions in homes and/or buildings and their related grounds include, for example, HVAC controllers such as thermostats, water heater controllers, water softener controllers, security system controllers, lawn sprinkler controllers, and lighting system controllers.

In a typical HVAC system, for example, such controllers can be employed to monitor and, if necessary, control various environmental conditions occurring within a structure. The controller may include a microprocessor and/or microcontroller that interacts with other components in the system via an I/O interface to regulate the temperature, humidity, venting, and air quality occurring at one or more locations within the structure. An internal sensor located within the controller and/or one or more remote sensors may be employed to sense when the temperature and/or humidity level reaches a certain threshold level, causing the controller to send a signal to activate or deactivate one or more components in the HVAC system.

In some instances, the controller may be configured to detect when a service event has occurred in one or more of the system components. In certain circumstances, for example, the controller may be configured to detect when one or more system components have malfunctioned or have gone offline, or have been in service beyond a recommended period of time and thus require maintenance. Depending on the type of service event detected, the controller can be configured to shut down one or more of the components until the system can be restored.

In some cases, the component triggering the service event may require servicing from the manufacturer or other authorized service technician in order to restore the system to normal operation. To notify the user where to obtain service, many manufacturers will place a sticker containing servicing information in an inconspicuous place such as on the inside door panel of the controller housing. After a service event has occurred, the user must know to open the controller door in order to obtain the servicing information. Accordingly, there is a need in the art to better provide the user with servicing information when a fault or other service event has been detected.

Many HVAC controllers, such as thermostats, have a user interface that includes a fixed segment display. In fixed segment displays controllers, all of display segments are typically predefined and manufactured into the display. During use, and to display one or more settings or parameters of the thermostat, the controller simply turns on appropriate segments on the display. While the use of fixed segment displays has worked satisfactorily for many applications, they can be somewhat limiting. For example, only those parameters and settings that were predefined and manufactured into the display can be typically be displayed, and updates or changes often cannot be made in the field. In addition, and because of the fixed nature of the segments on the fixed segment display, a location or region on the display is typically dedicated to displaying certain information. In some cases, this leads to the layout of the display items not to be optimal from an ease of use and/or ease of understanding point of view. Moreover, fixed segment displays can be somewhat limited in the types of content that can be displayed on the display. For example, graphical images, menus as well as other types of content often cannot be displayed.

Some of the limitations of fixed segment displays have been overcome with the use of graphical displays such as dot matrix displays. For example, some HVAC controllers have incorporated dot matrix displays in order to display a wider variety of menus with better placement of information and selections on the display, which can help make the operation of the controller more intuitive to the user. However, to date, many of these controllers are limited in the type of content that can be displayed on the display, and typically do not provide a mechanism for updating and/or uploading new information for use by the controller and/or for viewing on the display.

SUMMARY OF THE INVENTION

The present invention relates to programmable controllers having a programmable service event display mode. A programmable controller in accordance with an illustrative embodiment of the present invention may include an interface for programming a service event display mode in the controller, and/or for displaying servicing information when a service event is detected by the controller. In certain embodiments, the interface may be provided as part of a user interface such as a touch screen or LCD panel/keypad inset within a controller housing. In other embodiments, the interface may be provided as a separate interface from the user interface, allowing the controller to be programmed from a location outside of the controller.

The controller may be operatively coupled to a number of other system components including, for example, a heating unit, a cooling unit, a ventilation unit, a filtration unit, a UV lamp unit, a humidifier/dehumidifier unit, and/or one or more local or remote sensors. The controller can be configured to check the status of the system components to determine if one or more of the components is functioning properly, has malfunctioned, or has gone offline. An event such as the triggering of a service indicator or the expiration of an equipment service event timer may cause the controller to display servicing information on the display unit, informing the user that servicing may be necessary or recommended. Alternatively, or in addition, the controller may be programmed to automatically contact a designated contractor, a service referral organization, a utility, a retailer, a manufacturer, and/or some other person or organization, requesting service for the detected event. In certain embodiments, the user may send a signal to the controller requesting that certain servicing information be displayed on the display unit, and/or that the controller contact a designated contractor, a service referral organization, a utility, a retailer, a manufacturer, and/or some other person or organization, as desired.

The present invention also relates to programmable controllers for homes and/or buildings and their related grounds, such as thermostats, that have a display and an external interface. The external interface may be use for uploading electronic images and/or other information from an external data source, and may use the uploaded electronic images and/or other information for programming and/or updating the controller and/or for viewing the electronic images and/or other information on the display of the controller.

DETAILED DESCRIPTION OF THE INVENTION

The following description should be read with reference to the drawings, in which like elements in different drawings are numbered in like fashion. The drawings, which are not necessarily to scale, depict selected embodiments and are not intended to limit the scope of the invention. Although examples of various programming and operational steps are illustrated in the various views, those skilled in the art will recognize that the many of the examples provided have suitable alternatives that can be utilized. While the various devices and systems illustrated herein are described specifically with respect to HVAC systems, it should be understood that the present invention could be employed in other systems, including, for example, security systems, lighting systems, sprinkler or drip water systems, audio/video systems, etc.

Figure 1:
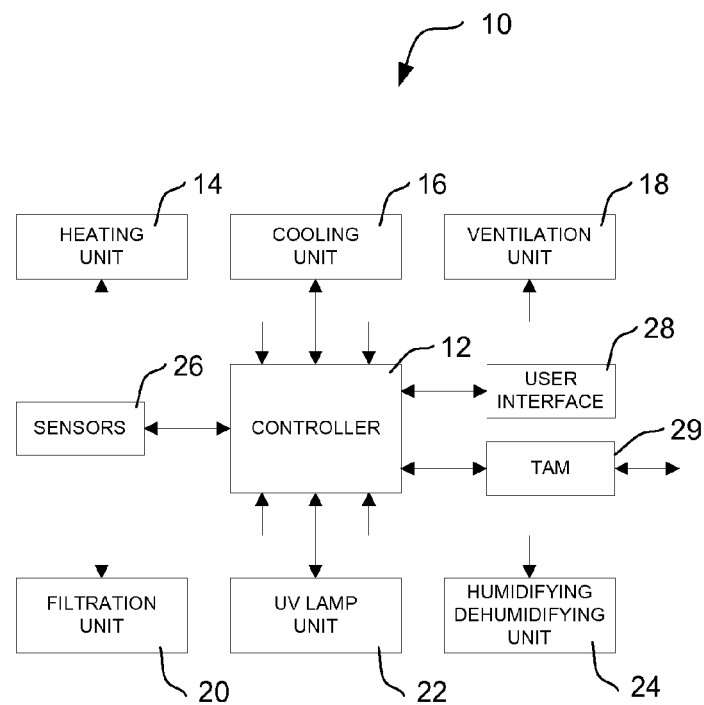
FIG. 1 is a block diagram of an illustrative HVAC system employing a controller having a programmable service event display mode.

Referring now to FIG. 1, a block diagram of an illustrative HVAC system 10 employing a controller 12 having a programmable service event display mode will now be described. Controller 12 may be operatively connected to one or more system components that can be activated to regulate various environmental conditions such as temperature, humidity and air quality levels occurring within a structure. As shown in FIG. 1, for example, the controller 12 can be connected to a heater unit 14 and cooling unit 16 that can be activated to maintain the structure at a particular temperature level. A ventilation unit 18 such as a fan or blower equipped with one or more dampers may be employed to regulate the volume of air delivered to the various rooms of the structure. A filtration unit 20, UV lamp unit 22, and humidifier/dehumidifier unit 24 may also be provided to regulate the air quality and moisture levels within the structure. One or more local and/or remote sensors 26 as well as other system components can also be connected to controller 12 to monitor and regulate the environment, as desired. The system components may be directly connected to a corresponding Input/Output (I/O) port or I/O pins on the controller 12, and/or connected to the controller via a network or the like, as desired.

The controller 12 may include a user interface 28 that allows a user or service technician to transmit signals to and from the controller 12. The user interface 44 can include a touch screen, a liquid crystal display (LCD) panel and keypad, a dot matrix display, a computer, and/or any other suitable device for sending and receiving signals to and from the controller 12. The controller 12 can be configured to display servicing information on the user interface 28 to notify the user when a fault or malfunction has been detected, or when servicing is necessary or desirable. In certain embodiments, for example, the controller 12 can be programmed to display the name, logo, URL and/or telephone number of a designated contractor, a service referral organization, a utility, a retailer, a manufacturer, and/or some other person or organization when a fault or other service event has been detected in one or more of the system components. In some cases, the controller may display a different name, logo, URL and/or telephone number, depending on the nature of the service event detected and/or the component or unit that needs service. For example, the name, logo, URL and/or telephone number of a designated heating contractor may be displayed when a service event related to the heating system is detected, and the name, logo, URL and/or telephone number of a designated security system contractor may be displayed when a service event related to the security system is detected. In some cases, a service event code and/or short description of the service event may be displayed.

As is discussed in greater detail with respect to FIGS. 5-10 below, such servicing information can be displayed prominently on a display unit, providing the user with information on where to call for servicing. Alternatively, or in addition, the controller 12 may be programmed to automatically contact a designated contractor, a service referral organization, a utility, a retailer, a manufacturer, and/or some other person or organization, requesting service for the detected event. In one illustrative embodiment, a Telephone Access Module (TAM) 29 may be provided. The TAM 29 may call the appropriate person or organization when a service event is detected by the controller 12. While a TAM is shown in FIG. 1, it is contemplated that the controller 12 may notify an appropriate person or organization when a service event is detected via an internet connection, a wireless connection (e.g. cell phone), or any other suitable communication method, as desired.

Figure 2:
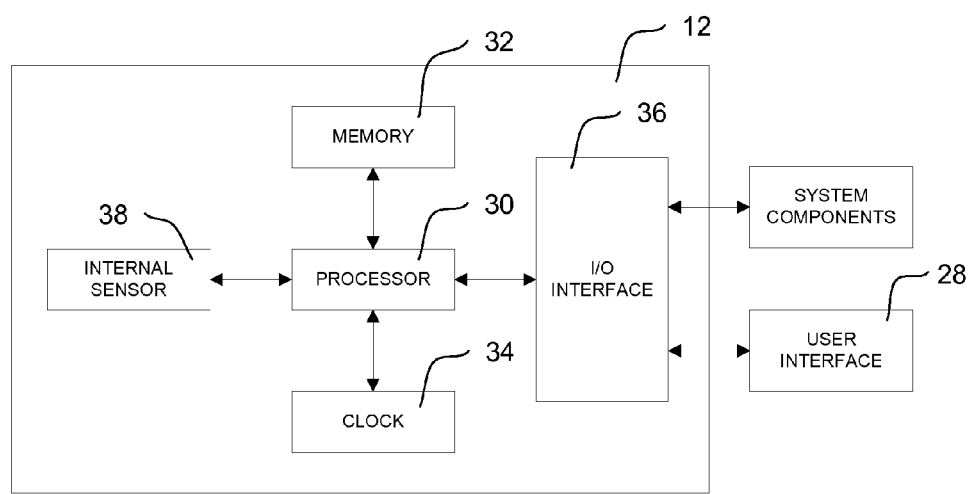
FIG. 2 is a block diagram of the controller and user interface of FIG. 1.

FIG. 2 is a block diagram of the controller 12 and user interface 28 of FIG. 1. As illustrated in FIG. 2, the controller 12 may include a processor 30 (e.g. a microprocessor/CPU), a storage memory 32, a clock 34, and an I/O interface 36 that connects the controller 12 to the various system components illustrated in FIG. 1. An internal sensor 38 located within the controller 12 can be employed to measure the temperature, humidity levels and/or other environmental conditions occurring within the structure. In some cases, the sensor 38 may be external to the controller 12.

Figure 3:
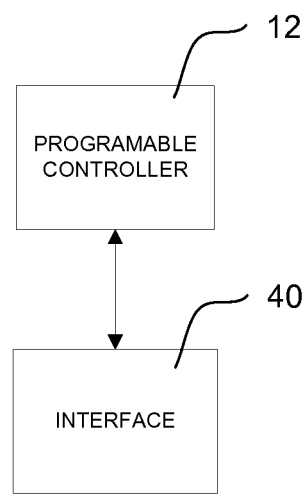
FIG. 3 is block diagram showing the controller of FIGS. 1-2 equipped with a programmable interface.

FIG. 3 is a block diagram showing the programmable controller 12 of FIGS. 1-2 equipped with an interface 40. The interface 40 may be configured to permit the manufacturer or other authorized technician to program the controller 12 to display servicing information on the user interface 40 when a fault is detected in one or more of the system components, or when the controller 12 has determined that a system component requires maintenance or other servicing. For example, the interface 40 can be used to set various equipment service event timers that can be used to remind the user to replace or clean the filter for the filtration unit 20, the pads for the humidifier/dehumidifier unit 24, the UV lamp for the UV lamp unit, the controller batteries, etc., after a certain period of time has elapsed. Other equipment service event timers may, of course, be implemented depending on the particular application.

The parameters for each equipment service event timer can be set to a particular default value, which can then be adjusted using the interface 40, as desired. When the equipment event timer elapses, the controller 12 can be configured to display a service reminder via the user interface 28 of FIG. 2 informing the user that service is suggested for the system.

The interface 40 may be provided as part of the user interface 28 described above, or may be provided as a separate interface from the user interface 28. In certain embodiments, for example, the interface 40 may include a menu or screen accessible via the user interface 28 using a security code or password. The menu or screen may be configured to permit only the manufacturer or other authorized technician or organization to program the servicing information into the controller 12, if desired.

In some embodiments, the controller 12 can be programmed at any time before, during or after the controller 12 has been installed. For example, the interface 40 may permit the servicing information to be programmed into the controller 12 in-house at the manufacturer, or at a later time during installation or servicing. In certain embodiments, for example, the interface 40 may include a data port for transferring data to the controller 12, allowing the manufacturer and/or service technician to program the servicing information into the controller 12. For example, using the data port, a service technician or manufacturer may upload servicing information into the controller 12. This information may include, for example, a logo, telephone number, email address, web page URL, etc., of a contractor, service referral organization, retailer, utility or other organization, as desired. This data may be uploaded from a PDA, laptop, or other portable or handheld device, if desired. In some cases, the logo may be in a graphical representation stored in the memory of the controller. The logo may be in, for example, bitmap, jpeg, gif, tiff, or any other suitable format.

In some embodiments, the interface 40 may be provided as part of a remote interface, allowing the manufacturer or other authorized technician to program the controller 12 at a location outside of the controller 12. In certain embodiments, for example, the interface 40 may include a receiver that can be used to receive servicing information over a wireless connection, such as an infrared connection, over a cell phone network, over a wired connection such as a telephone line, or any other suitable connection. Alternatively, or in addition, the interface 40 may be connected to the World Wide Web (WWW), which may allow the servicing information to be uploaded into the controller 12 from a remote location across the WWW.

Figure 4:
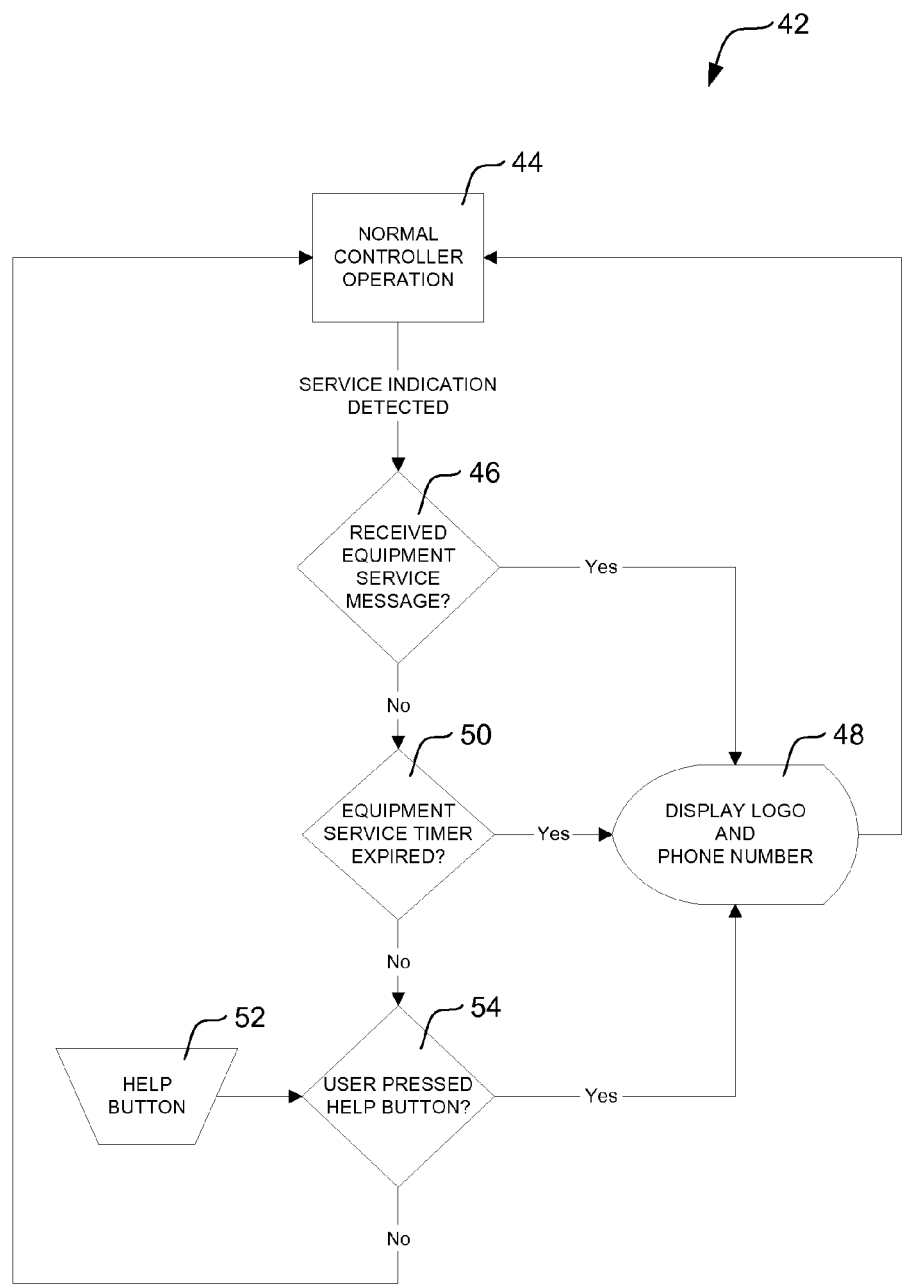
FIG. 4 is a flow chart of an illustrative service event routine programmed within a controller equipped with a service event display mode.

Referring now to FIG. 4, an illustrative service event routine programmed within a controller equipped with a service event display mode will now be described. The service event routine, indicated generally by reference number 42, may begin from a normal controller operation mode, indicated generally by block 44. From the normal controller operation mode 44, the controller may be configured to check the operating status of one or more of the system components to determine if the system components are functioning properly, as indicated generally by block 46. In some embodiments, the controller may periodically poll each of the system components and obtain current status information. If the controller receives a signal from one or more of the system components indicating a system fault, loss of power or other service indicator, the controller can be configured to display servicing information such as the name, logo, URL, telephone number and/or other information for a designated contractor, service referral organization, manufacturer, retailer, utility and/or other person or organization. The controller may also be configured to display a service event code, a description of the fault, and/or any other useful information, as indicated generally by block 48. In some cases, different servicing information can be displayed depending on which system component(s) indicated a positive service indicator. For example, one contractor logo and telephone number may be displayed if the cooling system provided a service indicator, and another contractor logo and telephone number may be displayed if the heating system provided a service indicator. The servicing information can be displayed temporarily for a certain period of time until the controller is reset and/or until the faulty system component is restored to normal operation.

If the controller does not receive a service indicator from one or more of the system components, the controller can be configured to determine whether any of the equipment service timers (if any) have elapsed, as indicated generally by block 50. If, for example, the controller determines that the filter for the filtering unit has been in use for a certain period of time and likely requires replacement, the controller can be configured display a logo and telephone number for an authorized filter contractor or dealer. Information about the type of filter to replace as well as other pertinent servicing information can also be displayed, as desired.

In certain embodiments, the controller 12 can include a help mode that can be activated by the user to obtain servicing information. As indicated by block 52, for example, the user may send a signal to the controller via a "help" button or other similar command. When the controller 12 receives a signal from the user requesting help, as indicated generally by block 54, the controller can be configured to display servicing information such as the logo, telephone number, etc. of a designated contractor, service referral organization, manufacturer, retailer, utility and/or other person or organization as desired. The controller can be configured to display the servicing information irrespective of whether a service indicator or expired equipment service event timer has been detected.

While the illustrative service event routine 42 shown in FIG. 4 includes a particular sequence of events which occur during the routine 42, it should be understood that the particular order at which each step occurs can be altered, if desired. For example, the controller may be configured to perform each step in parallel, or in a sequence different from that illustrated in FIG. 4. In addition, one or more steps in the service event routine 42 may be eliminated, if desired, depending on type of controller employed.

Figure 5:
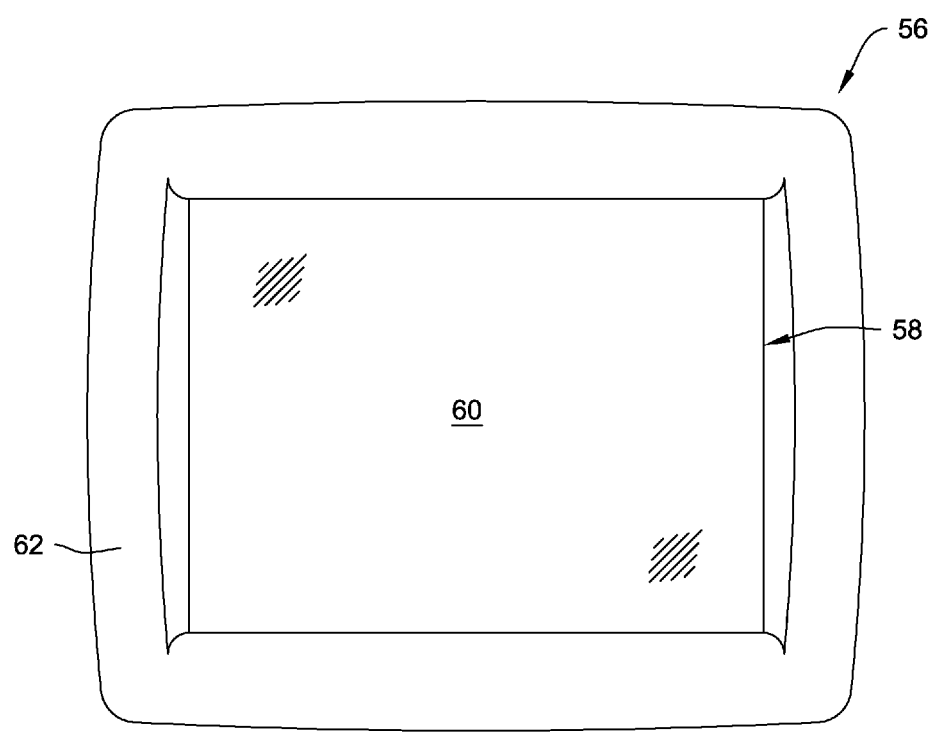
FIG. 5 is a view of an illustrative HVAC controller equipped with a touch screen interface.

FIG. 5 is a view of an illustrative controller 56 equipped with a user interface 58 for displaying servicing information when a service event is detected. In the illustrative embodiment of FIG. 5, user interface 58 includes a touch screen 60 configured to display information and transmit signals to and from the controller 56. Some examples of suitable touch screens 60 for use with the controller 56 may include resistive, capacitive, infrared or surface acoustic wave (SAW) type touch screens. The touch screen 60 may be either inset or recessed within a controller housing 62, as shown in FIG. 5, or may be provided as a separate component for use with a personal digital assistant (PDA), PC computer, or other remote device. In certain embodiments, the touch screen 60 can be provided as part of a liquid crystal display (LCD) panel, cathode ray tube (CRT), dot matrix display, or other suitable display device.

Figure 6:
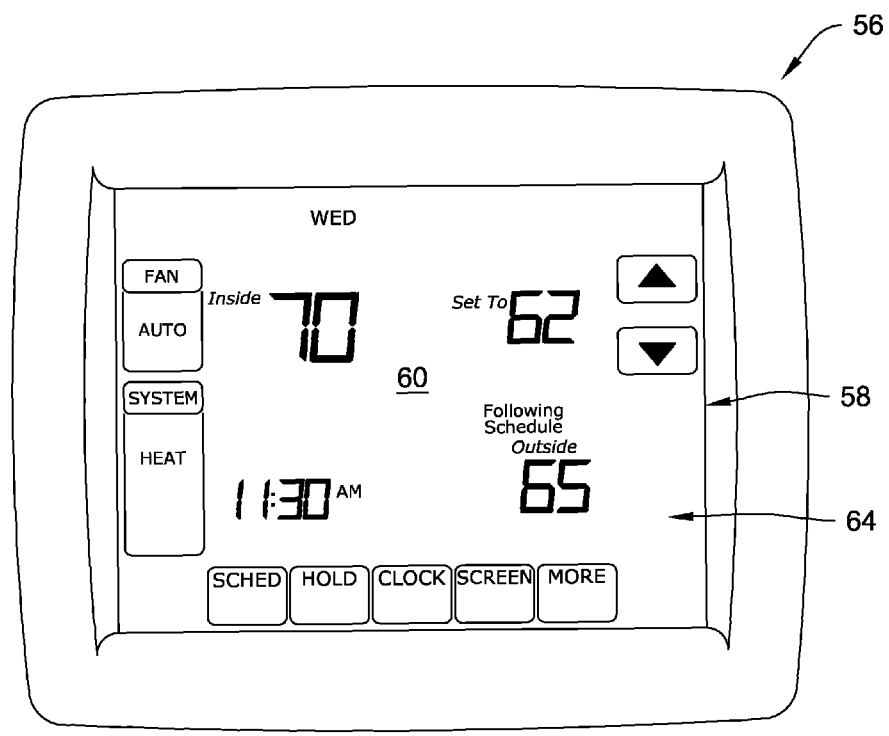
FIG. 6 is a pictorial view showing the illustrative controller and user interface of FIG. 5 during normal controller operation.

FIG. 6 is a pictorial view showing the illustrative controller 56 and user interface 58 of FIG. 5 during normal controller operation. As shown in FIG. 6, the touch screen 60 may be configured to display a main menu screen 64 that provides the user with information about the operational status of the controller 56, the current inside and outside temperature, the current time and day of week, the current heat and/or cool set point, as well as other operational information. The main menu screen 64 may be the default screen that appears on the touch screen 60 when the controller 56 is initially activated, after a loss of power has occurred, or after no activity has been detected by the user interface 58 for a certain period of time (e.g. after 1 minute of non-activity).

By pressing various icon buttons on the touch screen 60, the controller 56 can be configured to cycle through one or more menus or screens to view and, if desired, modify various operational settings within the controller 56. For example, the user can use the touch screen 60 to adjust the current temperature or humidity levels, change the clock or date settings on the controller 56, set a vacation schedule on the controller 56 that can be run while the user is away, etc. The touch screen 60 may also be used to check the status of the various system components connected to the controller 56.

Figure 7:
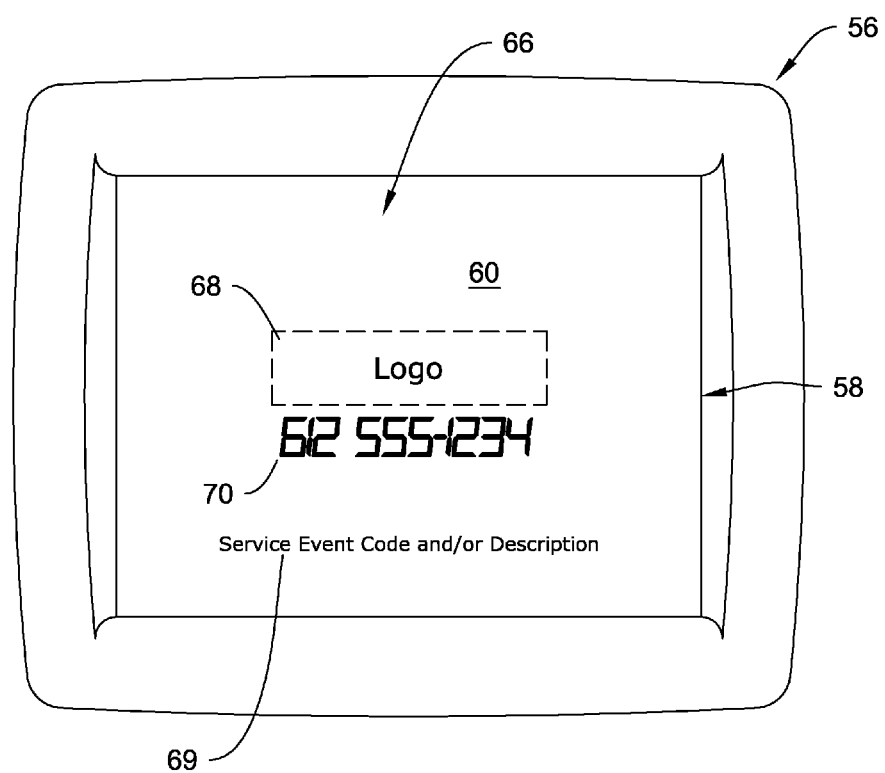
FIG. 7 is a pictorial view showing the illustrative controller and user interface of FIG. 5 after a service event has been detected.

FIG. 7 is a pictorial view showing the illustrative controller 56 and user interface 58 of FIG. 6 after a service event has been detected. As shown in FIG. 7, the controller 56 can be configured to display a service event display screen 66 on the touch screen 70 that informs the user that a service event has been detected. The service event display screen 66 may include, for example, a logo 68 and telephone number 70 indicating where to call for servicing or replacement. Other information in addition to, or in lieu of, the logo 68 and telephone number 70 may also be provided on the service event display screen 66, as desired. In some cases a service event code and/or short description of the service event may also be displayed, as shown at 69. The service event code may help a service technician diagnose the problem on the phone and possibly help provide a corrective action to the user via the phone. Also, the service event code may help the service technician determine what parts to order or bring to correct the problem.

A short description of the service event may help the user identify and possibly correct the problem. For example, if the service event was triggered as a result of the controller 56 determining that an equipment service event timer has expired, the controller 56 can be configured to display the particular device requiring service, and a recommended course of action. If, for example, an equipment service event timer for the filter has expired, the controller 56 can be configured to display the text "REPLACE FILTER" or other similar text on the touch screen 60, along with an appropriate logo, telephone number, and/or address for an authorized dealer of the filter, along with the part number of the filter, if desired. Similar messages can be displayed for other system components such as the humidifier pad, UV lamp, and batteries, as necessary.

The service event display screen 66 can be triggered when the controller 56 detects a fault in one or more of the system components, or when an equipment service event timer previously programmed in the controller 56 expires. In certain embodiments, the service event display screen 66 can be activated by the user by pressing one or more of the icon buttons on the touch screen 60, causing the controller 56 to display the desired servicing information on the screen 60.

Figure 8:
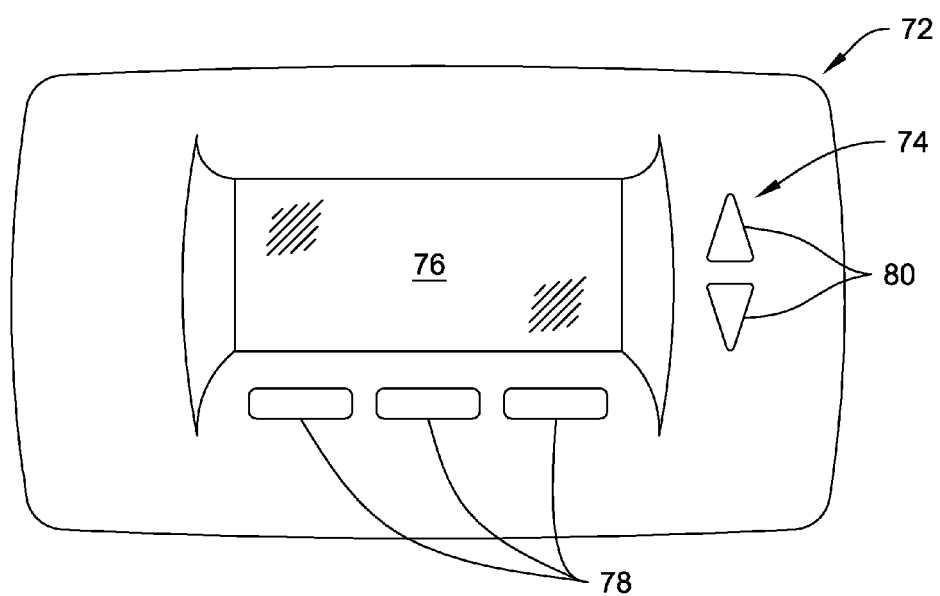
FIG. 8 is a view of another illustrative HVAC controller equipped with a display panel and keypad interface.

FIG. 8 is a view of another illustrative controller 72 equipped with a user interface 74 for displaying servicing information when a service event is detected. In the illustrative embodiment of FIG. 8, user interface 74 includes a display panel 76 and a series of buttons 78, 80 that can be pressed by the user to scroll through various menus or screens displayable on the display panel 76. The display panel 76 can include any number of suitable display devices, including, for example, a backlit LCD panel or LED screen.

Figure 9:
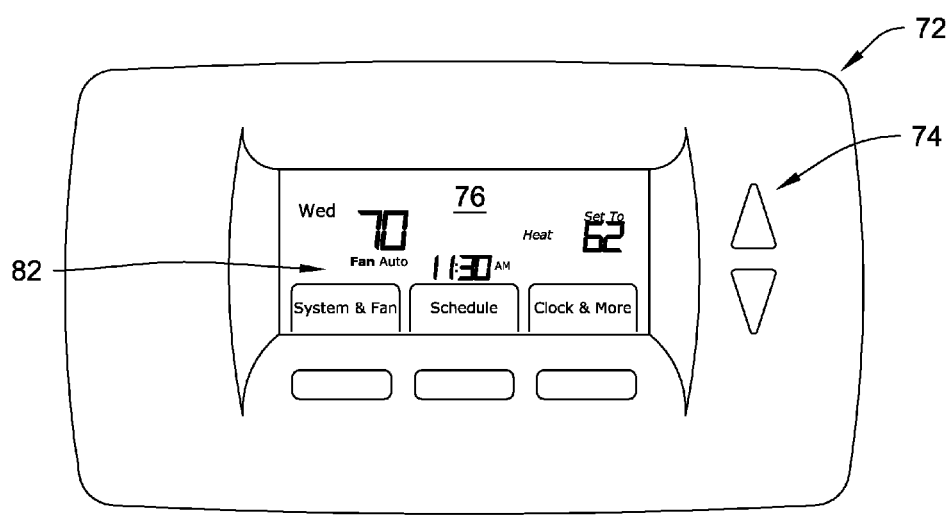
FIG. 9 is a pictorial view showing the illustrative controller and user interface of FIG. 8 during normal controller operation.

FIG. 9 is a pictorial view showing the illustrative controller 72 and user interface 74 of FIG. 8 during normal controller operation. As shown in FIG. 9, the controller 72 can be configured to display a main menu screen 82 on the display panel 76, similar to that described above with respect to FIG. 6.

Figure 10:
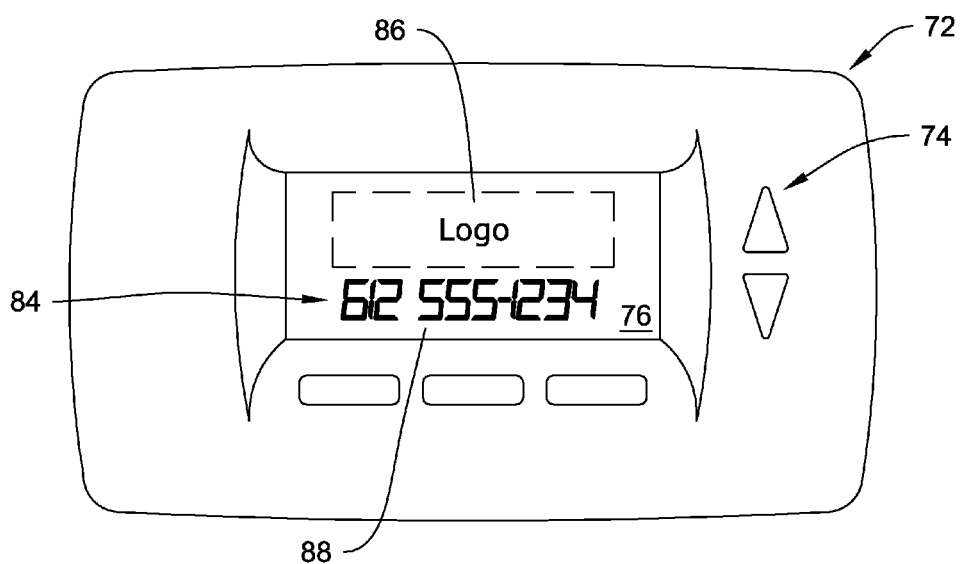
FIG. 10 is a pictorial view showing the illustrative controller and user interface of FIG. 8 after a service event has been detected by the controller.

As shown in FIG. 10, the controller 72 can be configured to display a service event display screen 82 on the display panel 76 that informs the user that a service event has been detected. The service event display screen 82 may include, for example, a logo 86 and telephone number 88 indicating where to call for servicing or replacement. Other information in addition to, or in lieu of, the contractor logo 86 and telephone number 88 may also be provided on the service event display screen 84, as desired.

The service event display screen 84 can be triggered when the controller 72 detects a fault in one or more of the system components, or when an equipment service event timer previously programmed in the controller 72 expires. In certain embodiments, the service event display screen 84 can be activated by the user by pressing one of the buttons 78, 80 (e.g. a help button 12), causing the controller 72 to display the desired servicing information on the display panel 76.

Figure 11:
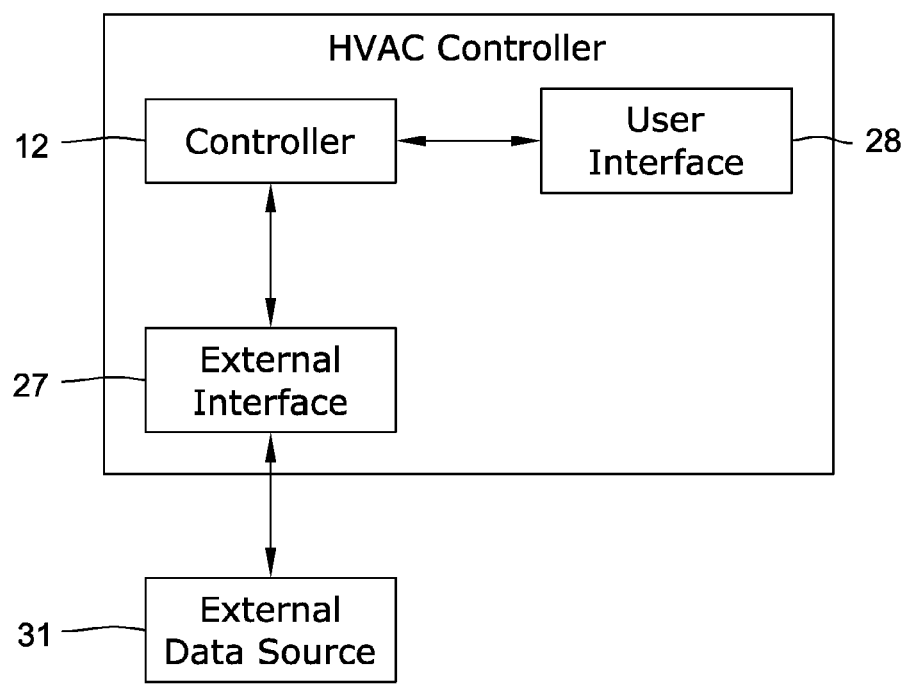
FIG. 11 is a block diagram of an illustrative controller having a display and an external interface.

FIG. 11 is a block diagram of an illustrative HVAC controller having a user interface 28 with a display, and an external interface 27 for interfacing with an external data source 31. The HVAC controller shown in FIG. 11 may, in some cases, be similar in many respects to that shown and described with reference to FIG. 1. That is, the HVAC controller of FIG. 11 may be operatively connected to one or more system components, such as, for example, a heating unit, a cooling unit, a ventilation unit, a filtration unit, a UV lamp unit, a humidifying/dehumidifying unit, and/or one or more local and/or remote sensors, as discussed with respect to FIG. 1. In some cases, the HVAC controller may be a thermostat.

The illustrative HVAC controller of FIG. 11 may have a controller 12 that is connected to the user interface 28. The controller 12 may any suitable controller such as a microprocessor, a microcontroller or the like. The user interface 28 may include a display such as a touch screen display. In some cases, the user interface 28 may include a display and one or more buttons, knobs, dials or other user input devices. The display of the user interface 28 may be, for example a liquid crystal display (LCD), a dot matrix display, a plasma display, and/or any other suitable type of display, preferably capable of displaying electronic images.

In the illustrative embodiment, the controller 12 is shown coupled to an external interface 27. The external interface 27 may be adapted to provide an interface between the controller 12 and an external data source 31. The controller 12 may in some instances have a memory, and the external interface 27 may facilitate uploading and/or downloading data between the controller 12 and the external data source 31.

In one illustrative embodiment, the external interface 27 may facilitate uploading electronic images from an external data source 31 to the controller 12, and the controller 12 may display the electronic images files on the display of the user interface 28. For example, the one or more electronic images that are uploaded from the external data source 31 may be displayed on the display of the user interface 28 as a background image (i.e. wallpaper image), an image on only part of the display, as a sequence of slide show images, a screensaver image, a scrolling text line image, and/or any other suitable image as desired. The electronic images may include still images, video images, text images, computer generated images, flash player images, or any other suitable image or image sequence, as desired. The electronic images may be in a JPEG, GIF, BMP, TIFF, PNG, WMF, PCX, MPEG, SWF (Adobe Flash), SCR (Windows™ Screen Saver Format), or any other suitable format.

External interface 27 may include a wired and/or wireless interface. For example, the external interface 27 may include a wired connector interface, a wireless interface (e.g. an optical interface and/or an RF interface), or any other suitable interface, as desired. For example, the wired connector interface may include one or more of a Universal Serial Bus (USB) interface, an Ethernet interface, a FireWire interface, a digital camera or cellular phone interface, and/or any other suitable electronic interface or interfaces, as desired. In some cases, the wired connector interface may include a port or connector for accepting one or more removable flash memories. Example removable flash memories include Compact Flash (CF), Secure Digital (SD), MicroSD, XD, thumb drives, and/or any other suitable removable memory, as desired.

When provided, the wireless interface may include, for example, a radio frequency (RF) wireless interface, an infrared wireless interface, a microwave wireless interface, and/or any other suitable wireless interface, as desired. In some cases, the wireless interface may operate according to one or more wireless protocols, such as, for example, a cellular communication protocol, the ZigBee protocol, the Bluetooth protocol, the WiFi protocol, an IrDA protocol, a dedicated short range communication (DSRC) protocol, the EnOcean protocol, and/or any other wireless protocol, as desired.

The external data source 31 may be any suitable data source that is capable of interfacing with the external interface 27. For example, the external data source 31 may be computer, a network (e.g. private network or World Wide Web), a cell phone, a PDA, a removable flash memory, or any other external data source, as desired. It is contemplated that the controller 12 may upload data from the external data source 31 and/or download data to the external data source 31 via the external interface 27.

In some cases, the controller 12 may upload one or more electronic images from the external data source 31, and then display the uploaded electronic images on the display of the user interface 28. In one instance, controller 12 may include a memory (internal and/or external) for storing at least one of the one or more electronic images uploaded from the external data source 31. In some cases, the memory of the controller 12 may be RAM, ROM, EEPROM, Flash memory, and/or any other suitable type of memory, as desired. In some cases, the controller 12 may be configured to read at least one electronic image stored in the external data source 31, before displaying the at least one electronic image on the display of the user interface 28.

In some embodiments, the memory of the controller 12 may only store a subset of the electronic images to be displayed, with the remainder of the electronic images stored on the external data source 31. During operation, the controller 12 may read up a desired electronic image or set of electronic images from the external data source 31, and display the electronic images or set of electronic images on the display of the user interface 28. Once displayed, the controller 12 may read up another desired electronic image or set of electronic images from the external data source 31, and display the other electronic images or set of electronic images on the display of the user interface 28. This may reduce the memory requirements of the controller 12, by using the external data source 31 as a storage medium. However, the external data source 31 may need to remain connected to the external interface 27 during operation.

In one specific example, it is contemplated the external data source 31 may include electronic images from, for example, a digital camera. When uploading such electronic images to the controller 12, the controller 12 may receive a first electronic image from the external data source 31, such as, for example, a removable flash memory, and display the first electronic image on the user interface 28. Then, controller 12 may receive a second electronic image from the external data source 31 and display the second electronic image on the user interface 28. This illustrative embodiment may use the external data source 31 as a storage medium for storing some or all of the electronic images while the controller 12 selects and/or displays the electronic images on the display of the user interface 28.

In another illustrative embodiment, the controller 12 may read up the desired electronic images from the external data source 31, and store the electronic images in a local memory that is accessible by controller (internal and/or external to the controller by within the HVAC controller). Then, during operation, the controller 12 may read up a desired electronic image from the local memory, and display the electronic images on the display of the user interface 28. In this illustrative embodiment, the external data source 31 may not need to remain connected during operation.

In one specific example, it is contemplated the external data source 31 may include electronic images from, for example, a digital camera. The controller 12 may upload and store a number of electronic images from the external data source 31, and in some cases all of the electronic images, and then display one or more of the uploaded electronic images on the display of the user interface 28. In this illustrative embodiment, the external data source 31 may not be used by the controller 12 as storage medium after the electronic images have been uploaded to the controller 12 and while the controller 12 selects and/or displays the electronic images on the display of the user interface 28.

In some cases, the controller 12 may download electronic images and/or other information to the external data source 31 via the external interface 27. For example, the controller 12 may download one or more electronic images to the external data source 31, and the external data source 31 may then be used to upload the one or more electronic images to another device, such as another HVAC controller, a computer, a PDA and/or any other suitable device. Alternatively, or in addition, the controller 12 may download one or more programming parameters, such as set points, schedules, confirmation information, or any other information to the external data source 31, and the external data source 31 may then be used to upload the information to another device, such as another HVAC controller, a computer, a PDA and/or any other suitable device.

In some embodiments, controller 12 may include an image selection tool to help a user in selecting which of the at least one electronic images to display on the display of the user interface 28. In some cases, the image selection tool may display thumbnail images of the at least one electronic images on the user interface 28 to aid a user in selecting which of the electronic images to display on the user interface 28, and in some cases for what purpose. In other cases, the image selection tool may display a list of the at least one electronic images on the user interface 28 to aid the user in selecting which of the electronic images to display on the user interface 28, and in some cases for what purpose. It is contemplated that the controller may provide one or more menus on the display of the user interface 28 to help the user upload, download, categorize, select, organize, move, delete, customize or otherwise work with the available electronic images.

In some illustrative embodiments, the controller 12 may be configured to select and display one of at least two electronic images according to one or more parameters of the HVAC controller. Example parameters may include a time of day related parameter, a date related parameter, a season related parameter, an operating mode related parameter, an outside temperature related parameter, an inside temperature related parameter, a ventilation related parameter, a schedule related parameter, a schedule period parameter, a local weather parameter, a parameter related to the birthday, anniversary and/or another special day of a user of the HVAC controller, and/or any other suitable parameter, as desired.

In one example, the controller 12 may be programmed to select and display a particular electronic image depending on the state or value of a parameter of the HVAC controller. For example, a first electronic image may be displayed when rainy weather is predicted, a second electronic image may be displayed when sunny weather is predicted, a third electronic image may be displayed when cloudy weather is predicted, and a fourth electronic image may be displayed when snowy weather is predicted. In this example, if the weather is predicted to be rainy, controller 12 may select and display the first electronic image, if the weather is predicted to be sunny, the controller 12 may display the second image, and so on.

In another example, it is contemplated that different electronic images may be associated with each of the four seasons of the year, and displayed accordingly. In another example, one or more electronic images may be associated with at least some holidays, such as, for example, Christmas, Halloween, 4$^{th}$ of July, Easter, and/or any other holiday, as desired. In yet another example, one or more electronic images may be associated with the time or period of a day. For example, the controller 12 may have an electronic image associated with each of a wake, a leave, a return, and a sleep period of a thermostat schedule. Then, the controller 12 may display the associated images during the corresponding periods of the thermostat schedule. More generally, it is contemplated that one or more electronic images may be associated with any suitable parameter of the HVAC controller, as desired, and displayed accordingly.

In some cases, it is contemplated that the controller 12 may display regularly updated electronic images or other information, such as, for example, weather, traffic and/or news information. In some cases, the controller may be in communication with the World Wide Web (WWW) or some other information source via external interface 27. In this example embodiment, the controller 12 may display weather information as the weather changes including providing electronic images associates with severe weather alerts and/or radar images (including radar loops if desired). Alternatively, or in addition, the controller 12 may provide electronic images of news information, such as, for example, top news stories, which may be retrieved by one or more media organizations via a wired or wireless network (e.g. the WWW).

More specifically, controller 12 may be configured to upload updated weather information, such as local or national weather forecasts, radar information, and/or severe weather alerts. In another example, controller 12 may be configured to upload updated news information, such as, for example, top news stories, local headlines, national headlines, world headlines, sports headlines, business headlines, or any other news data, as desired. In some cases, the user may enter information related to the location of the thermostats and/or information related to his/her interests, and the controller 12 may then displayed information that is most relevant to the user's location and/or interests on the display of the user interface 28.

In some cases, the controller 12 may be configured to upload one or updates to the controller software and/or operating system from the external data source 31, and then install the updated controller software and/or operating system on the controller 12. The software updates may, in some cases, be or include firmware updates. The software updates may correct known bugs, improve performance, add functionality, and/or otherwise improve the operation of the controller 12.

Figure 12:
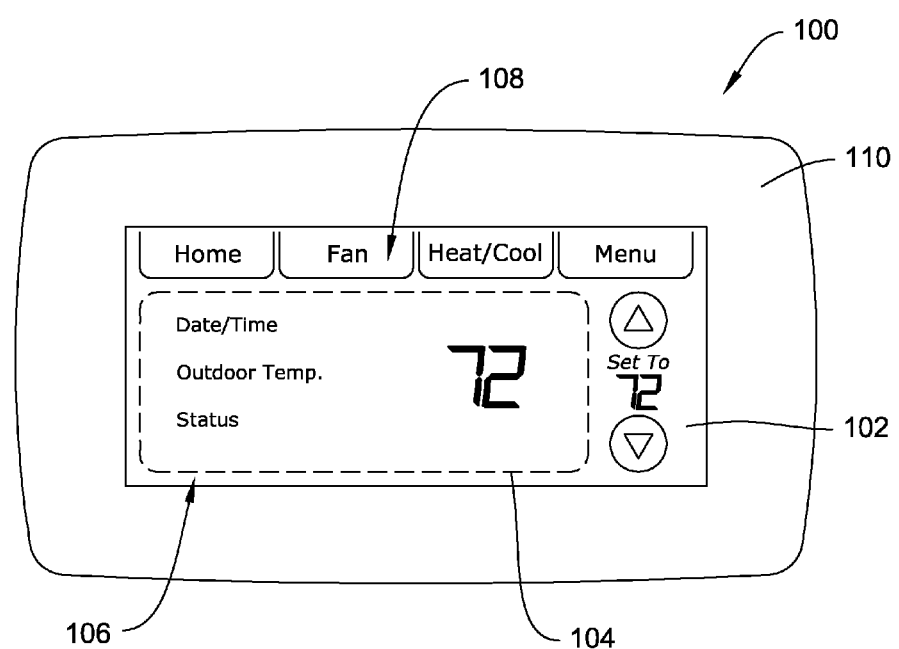
FIGS. 12-13 are pictorial views showing an illustrative controller and user interface having a background image displayed on part of the display.
Figure 13:
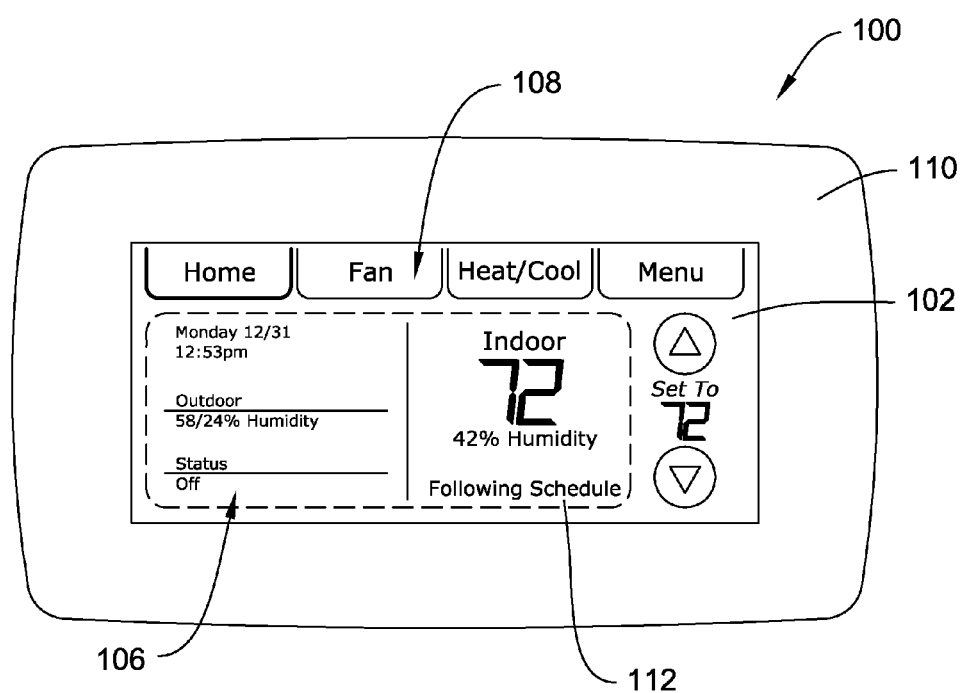

FIGS. 12-13 are pictorial views showing an illustrative HVAC controller 100 and user interface 106 having a background image displayed on part of the display. In the illustrative embodiment, user interface 106 includes an LCD touch screen 102 configured to display information and transmit signals to and from the controller 100. Some examples of suitable touch screens 102 may include resistive, capacitive, infrared or surface acoustic wave (SAW) type touch screens. The touch screen 102 may be either inset or recessed within a controller housing 110, as shown in FIG. 12. In certain embodiments, the touch screen 102 can be provided as part of a liquid crystal display (LCD) panel, cathode ray tube (CRT), dot matrix display, or any other suitable display device.

In the illustrative embodiment of FIG. 12, the touch screen 102 may be configured to display a main menu screen 108 that provides the user with information about the operational status of the HVAC controller 100, the current inside and outside temperature, the current time and day of week, the current heat and/or cool set point, as well as other operational information. The main menu screen 108 may be the default screen that appears on the touch screen 102 when the controller 100 is initially activated, after a loss of power has occurred, or after no activity has been detected by the user interface 106 for a certain period of time (e.g. after 1 minute of non-activity).

By pressing various icon buttons on the touch screen 102, the controller 100 can be configured to access one or more sub-menus or screens to view and, if desired, modify various operational settings of the HVAC controller 100. For example, the user may use the touch screen 102 to adjust the current temperature or humidity levels, change the clock or date settings of the controller 100, set a vacation schedule on the controller 100 that can be run while the user is on vacation, etc. In the illustrative embodiment, the touch screen 102 may also be used to check the status of the various system components connected to the HVAC controller 100.

In the illustrative embodiment, touch screen 102 may be configured to display an electronic image 104 as a background image, or wallpaper, on the display. The electronic image 104 is illustrated in dashed lines in FIG. 12. The electronic image 104 may be uploaded onto the controller 100 via an external interface (see FIG. 11), or, in other cases, the electronic image 104 may be preloaded onto the controller 100, if desired. As illustrated, the one or more thermostat parameters may be displayed on top of at least a portion of the background image 104. In the illustrative example, the one or more thermostat parameters that are displayed on top of the background image 104 include a date/time parameter, an outdoor temperature parameter, a HVAC status parameter and an inside temperature parameter. However, these are only illustrative in nature.

As illustrated, the electronic image 104 can be displayed on the main menu screen 108. It is contemplated that the electronic image 104 may be displayed on only the main menu screen 108 of the controller, or on the main menu screen 108 and at least some of one or more sub-menus or screens of the controller 100, as desired. In some cases, electronic image 104 may be displayed on only a portion of touch screen 102, as shown. However, in other cases, it is contemplated that electronic image 104 may be displayed on substantially the entire area of the touch screen 102 display, if desired.

It is contemplated that the controller 100 may be configured to display regularly updated news and/or weather information in a display box or region (not shown) on the display. For example, touch screen 102 may include a box or region including, for example, scrolling text displaying the regularly updated electronic images and/or data, such as in a crawl along a top or bottom of the of the display screen. Alternatively, the regularly updated electronic images and/or data may be displayed as a background image, or wallpaper, on the display, if desired.

FIG. 13 is similar to FIG. 12, with the controller 100 having a user interface 106 displaying an electronic image 112 as a background image, or wallpaper. In the illustrative embodiment, information about the operational status of the controller 100, the current inside and outside temperature, the current time, date, and day of week, the current heat and/or cool set point, the humidity, as well as other operational information may be displayed on top of the electronic image 112, if desired. In the illustrative example, the electronic image 112 shows clouds. However, it is contemplated that any suitable electronic image 112 may be used, as desired.

Figure 14:
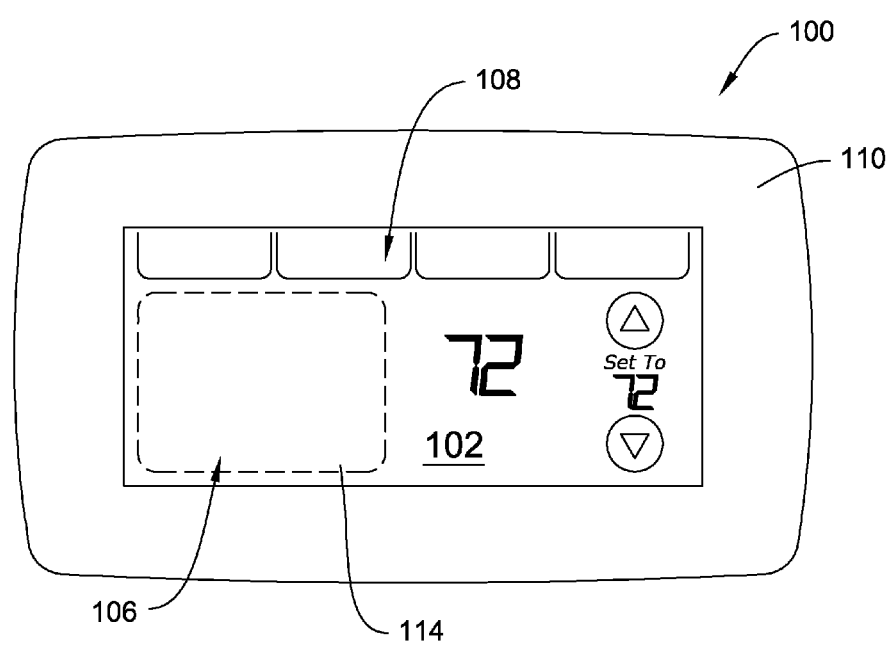
FIG. 14 is a pictorial view showing another illustrative controller and user interface having an electronic image displayed on the display.

FIG. 14 is a pictorial view showing another illustrative controller 100 and user interface 106 having an electronic image 114 displayed on only part of the display. In the illustrative embodiment, the touch screen 102 includes a first region and a second region. The first region of the touch screen 102 may display the electronic image 114 as a background image. The second region of the touch screen 102 may display one or more operational parameters, such as thermostat parameters. In the illustrative embodiment, the first region and the second region may not overlap, but this is not required. In some cases, it is contemplated that at least some of the one or more thermostat parameters may overlap or overlay a portion of the electronic image 114 as shown in FIGS. 12-13, but this is not required or even desired in some embodiments.

In the illustrative example, the first region displaying the electronic image 114 is illustrated as containing a left side of the touch screen 102. However, it is contemplated that the first region may be positioned on the right side of the touch screen 102, in the middle of the touch screen 102 having the one or more thermostat parameters on both the right and left side of the first region, along the top and/or bottom of the touch screen 102, or any other suitable position, as desired.

Figure 15:
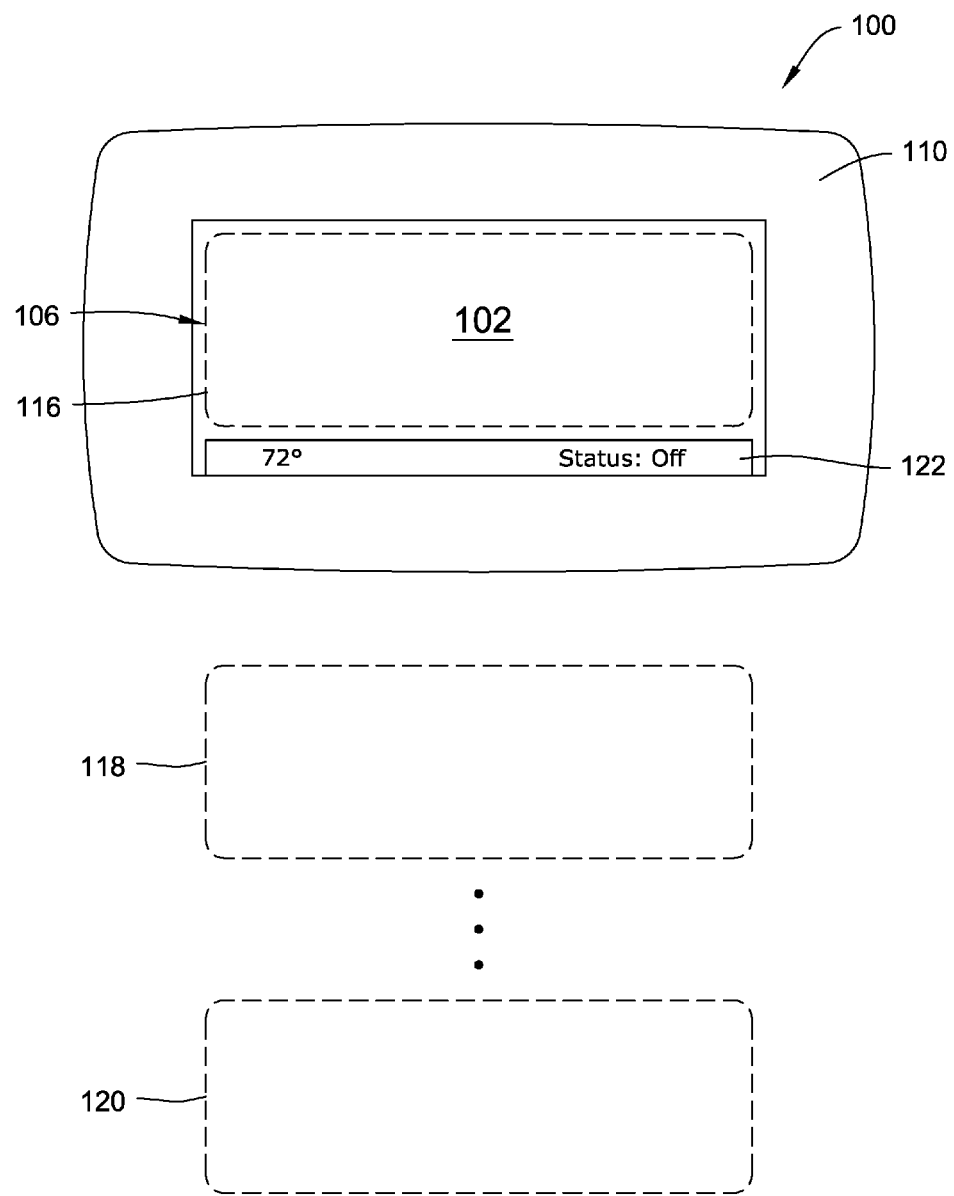
FIG. 15 is a schematic view of an illustrative controller and user interface displaying a plurality of electronic images in a slide show format.

FIG. 15 is a schematic view of an illustrative controller 100 and user interface 106 displaying a plurality of electronic images 116, 118, 120 in a slide show format. Again, the electronic images are illustrated in dashed lines, with subsequently displayed electronic images illustrated below the controller 100. In the illustrative embodiment, the controller 100 may be configured to sequentially display two or more electronic images 116, 118, and 120 on at least a portion of the touch screen 102. In some cases, the sequential display may be in slide show format. In some cases, it is contemplated that the slide show may function as a screensaver for the controller 100, and may automatically activate after a period of no user interaction.

In some illustrative embodiments, the user may select which electronic images to include in the slide show. However, in other cases, the controller 100 may select the electronic images to include in the slide show, such as all available electronic images, or some portion thereof. In some cases, the electronic images 116, 118, 120 may be selected from a group of uploaded and/or preloaded electronic images, if desired.

Once the user has selected the electronic images 116, 118, 120, or the controller 100 has determined the electronic images 116, 118, 120 to display, an order of display may be determined. In some cases, the user may select the order of display, while in other cases, the controller 100 may determine the order. For example, the order of display may be random, by date, by file name, etc., if desired. In some cases, the controller 100 may be configured to allow a user to select which of the electronic images 116, 118, 120 will be shown more often (e.g. given priority) in the slide show format than other available electronic images.

As indicated above, and in some illustrative embodiments, the slide show may function as a screen saver for the controller 100. That is, the slide show may be automatically initiated after a period of non-use by the user. In other cases, the slide show may be initiated by a user command, a time of day, a programmed schedule of the controller 100, or at any other suitable time.

During operation, and in the illustrative embodiment, the controller 100 may sequentially display the plurality of electronic images 116, 118, 120 on the display. The sequential display may display a first electronic image 116 for a period of time. In some cases, the period of time may be selectable by the user. Then, the controller may display a second electronic image 118 for a period of time, and so forth until the controller 100 display a last electronic image 120. Then, and in some cases, the slide show may be repeated, or the slide show may terminate, as desired.

As noted above, the controller 100 may display each electronic image 116, 118, 120 for a period of time. In some cases, the period of time may be in the range of 1 second to 5 minutes, such as, for example, 1 second, 2 seconds, 3 seconds, 10 seconds, 20 seconds, 30 seconds, or 1 minute. However, it is contemplated that any suitable period of time may be used, as desired. The period of time that an electronic image is displayed may be about the same for each image, but this is not required.

In some embodiments, the slide show may have a transition between electronic images, such as, for example, a slide show effect. The slide show effects may include, but is not limited to, a fade effect, a dissolve effect, a shutter effect, a cross-comb effect, a mask effect, a brick effect, a fly-in effect, as well as many other slide show effects. In some embodiments, the slide show effect may vary throughout the slide show, but this is not required.

It is contemplated that the controller 100 may display one or more parameters of the controller 100 during the slide show. For example, and as illustrated in FIG. 15, the controller 100 may include a parameter box 122 displayed on a portion of the touch screen 102 during the slide show. In the illustrative example, the parameter box 122 is positioned across the bottom of the touch screen 102. However, it is contemplated that a parameter box 122 may be positioned on the top, right side, left side, or in any other suitable location on the touch screen, as desired. More generally, it is contemplated that one or more parameters of the controller 100 may be displayed in any suitable manner during the slide show, if desired. It is also contemplated that a previous and/or next button may be provided on the touch screen 102 during the slide show. The previous and/or next buttons may allow the user to manually sequence through the slide show.

Figure 16:
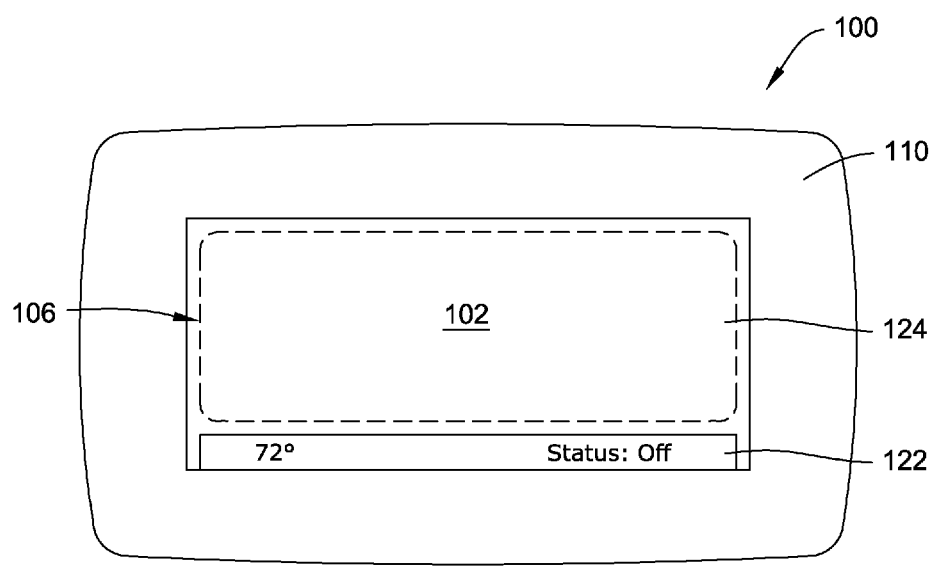
FIG. 16 is an illustrative view of an illustrative controller having a screensaver.

FIG. 16 is an illustrative view of an illustrative controller 100 having a screensaver. The embodiment of FIG. 16 is similar to that of FIG. 15 except instead of having a slide show of electronic images, the screensaver may include one electronic image 124, such as, for example, a digital still image, a video, an electronic animation, or any other suitable electronic image, as desired. In some cases, the electronic image 124, again illustrated in dashed lines, may be uploaded to the controller 100 via the external interface 27 (see FIG. 11). When an animation is provided, the animation may include a scrolling marquee, 3D boxes, flying objects, moving/changing shapes, and/or any other suitable animation, as desired. In some cases, the screensaver may be downloaded from the World Wide Web, or provided to the controller 100 by way of a removable memory card, as desired. In some cases, the particular electronic image 124 used for the screen saver may be selected by the user, and/or in some cases, may depend on one or more current parameters of the controller 100, if desired.

Figure 17A:
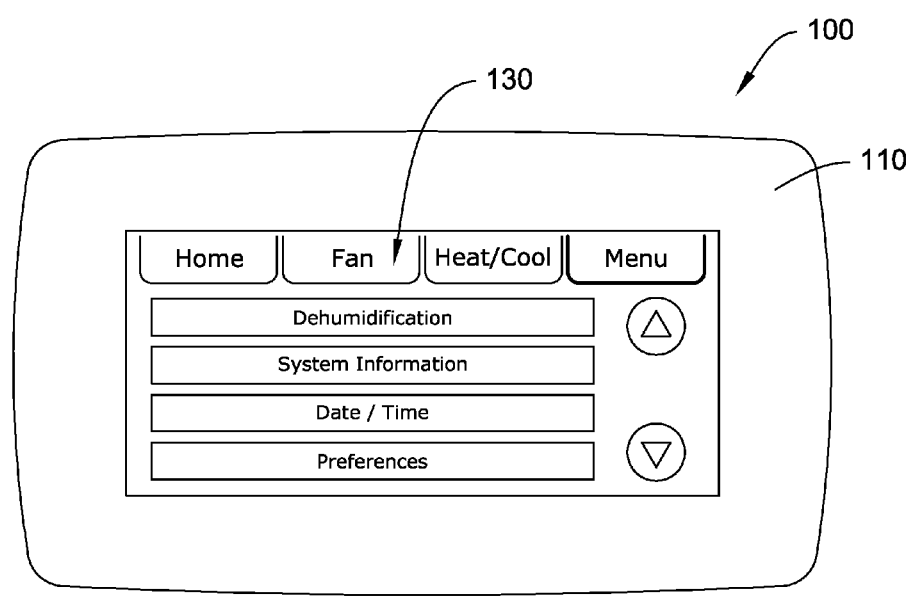
FIGS. 17A-17F are illustrative pictorial views of a controller having a menu for selecting electronic images for display.

FIGS. 17A-17F are illustrative pictorial views of a controller having a menu for selecting electronic images for display. FIG. 17A is an illustrative view of a controller 100 displaying a menu 130 after selecting the "Menu" option of FIG. 13. The illustrative menu 130 may include multiple options to control various settings of controller 100. For example, there may be a set/create schedule option, a vacation option, a humidification option, a dehumidification option, a system information option, a date/time option, a preferences option, a temporary schedule option, a schedule fan option, a security settings option, an installer set up option, as well as any other settings option, as desired.

Figure 17B:
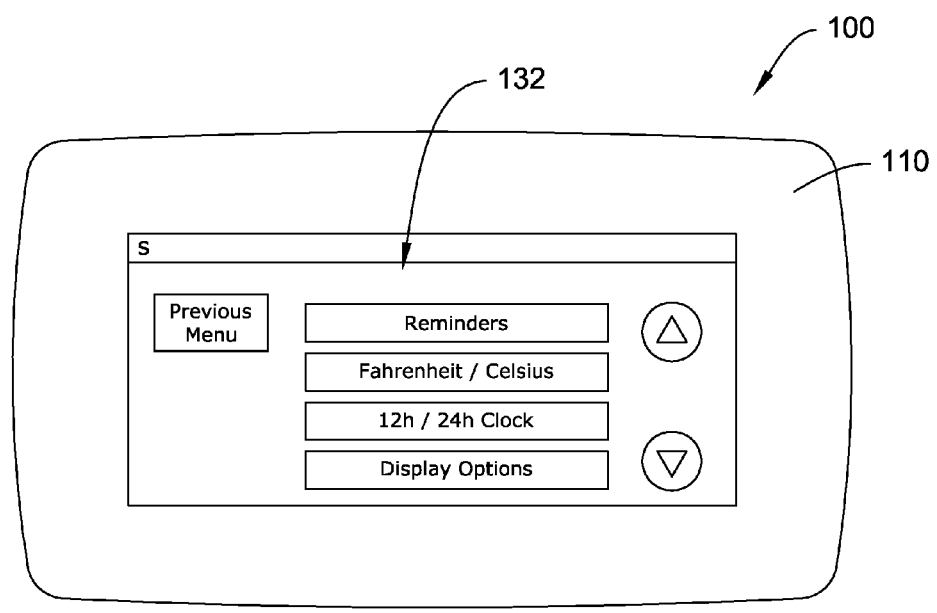

If the preferences option of menu 130 is selected, menu 132 as shown in FIG. 17B may be displayed. Menu 132, or the preference option menu, may include many controller preferences, such as, for example, a reminders option, a Fahrenheit/Celsius option, a 12 h/24 h clock option, a display option, a language option, a schedule option, an adaptive intelligent recovery option, a restore energy star settings option, a wireless device manager option, a daylight savings time option, as well as any other preference option, as desired. As illustrated, menu 132 may also include a previous menu option to return to menu 130 of FIG. 17A, if desired.

Figure 17C:
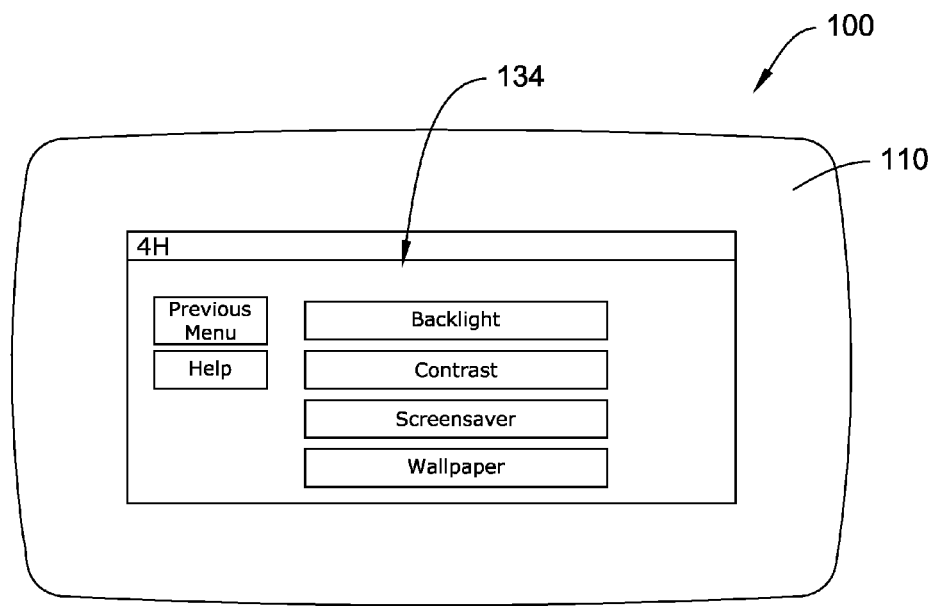

If the display option of menu 132 is selected, menu 134, as shown in FIG. 17C, may be displayed. Menu 134, or the display option menu, may include many options that may control display settings. For example, menu 134 may include a backlight option, a contrast option, a screensaver option, a wallpaper option, as well as many other display options, as desired. In some cases, as illustrated, menu 134 may include a previous menu option to return to menu 132 of FIG. 17B, and a help option that may display help information related to the use of the display option of menu 132.

Figure 17D:
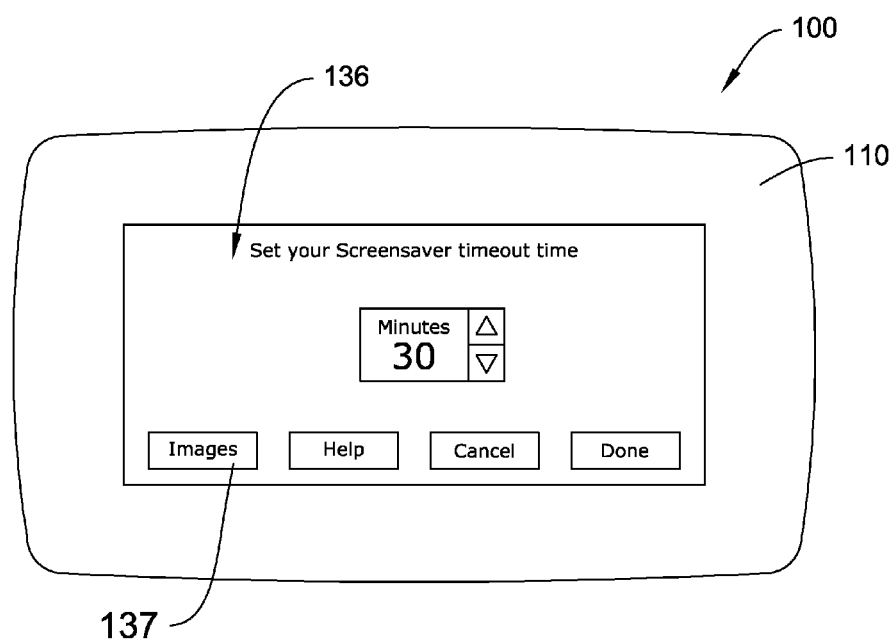

When the screensaver option of menu 134 is selected, menu 136, as shown in FIG. 17D, may be displayed. Menu 136, or the screensaver settings menu, may include settings to control the screensaver for the controller 100. For example, menu 136 may include a screensaver timeout setting that may be adjusted by the user to increase or decrease the screensaver timeout time. For example, the screensaver timeout time may range from 1 minute to 90 minutes. However, it is contemplated that any suitable time may be used, as desired.

In some cases, menu 136 may also include an image option 137. The image option 137 may control the settings of the one or more electronic images that are displayed by the screensaver, and in some cases, the desired screensaver effects (e.g. single image screen saver, slideshow, animation, etc.). Additionally, in some embodiments, menu 136 may include a cancel option, a help option, and a done option. In some cases, though not explicitly illustrated in FIG. 17D, menu 136 or image option 137 may include a transition option that may control the settings of the transitions or slide show effects between electronic images of the screensaver, if a slide show is desired.

Figure 17E:
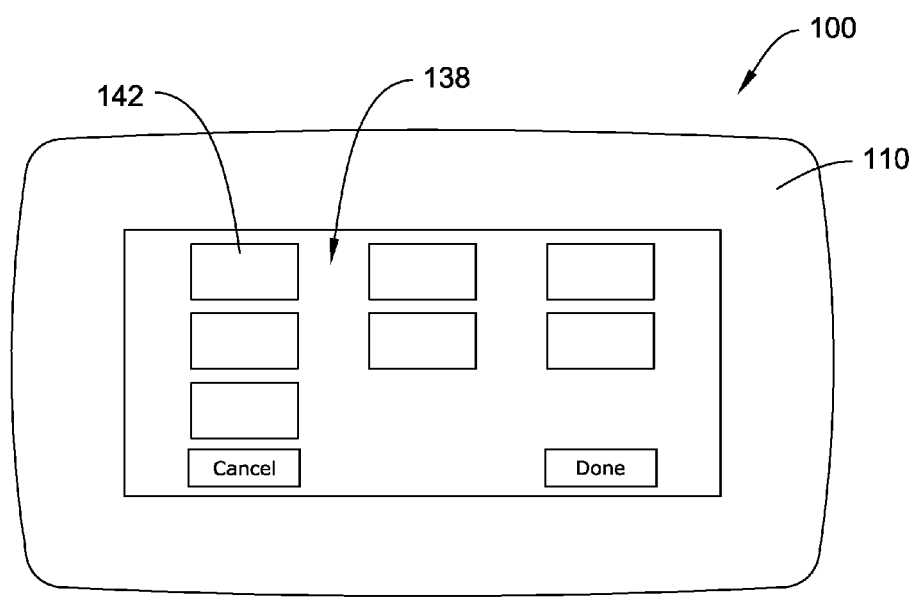
Figure 17F:
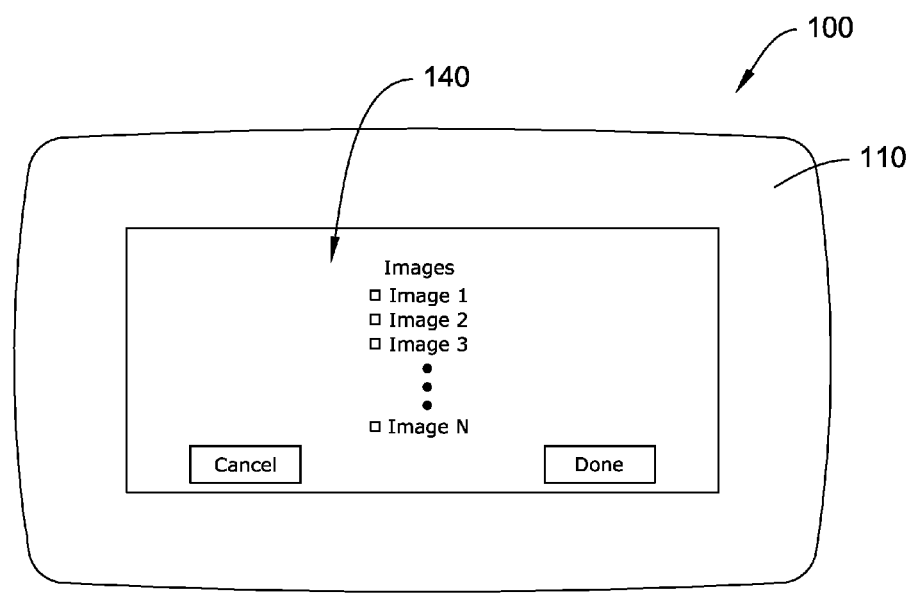

If the image option 137 of menu 136 is selected, menu 138, as shown in FIG. 17E may be displayed. Menu 138 may include one or more thumbnails 142 or icons, each corresponding to one or more electronic images uploaded and/or preloaded onto controller 100. With menu 138 displayed, a user may select one or more desired images for use by a slide show and/or screensaver by selecting one or more thumbnails 142. To select a thumbnail 142, a user may simply touch the touch screen 102 on the thumbnail 142 highlighting the thumbnail 142. To deselect a selected electronic image, a user may touch the touch screen 102 on the selected thumbnail 142, removing the highlighting from the thumbnail 142. Once all the desired thumbnails 142 are selected, the user may select "Done" to save the settings in memory. If a user does not want the settings saved, the user may select "Cancel" to exit the menu 138.

If in menu 134 of FIG. 17C, a wallpaper setting option is selected, a menu similar to menu 138 may be displayed allowing the user to select one or more thumbnails for the wallpaper image, as desired. Furthermore, menu 138, or any other suitable menu, may include an option to display a thumbnail or icon for one or more regularly updated electronic images from the World Wide Web or other information source on the touch screen 102 display, as desired. For example, a thumbnail or icon may be presented for displaying regularly updated weather, news, or any other information, and sometimes an option to select the format, as desired.

Additionally, in some cases, there may be an additional menu option to select the format for the wallpaper, such as, for example, the entire display wallpaper or split display wallpaper with the electronic image in a first region and the controller 100 parameters in a second region, as described with respect to FIG. 14.

As an alternative to FIG. 17E, menu 140 may be provided when selecting the image option of menu 136 and/or the wallpaper option of menu 134, if desired. Menu 140 may provide a list of electronic images that may be selected to display in the screensaver and/or wallpaper. In the illustrative embodiment, the list may include a box next to each electronic image indicating if the image is selected. Alternatively, the image name may be highlighted in the list if selected. However, it is contemplated that any suitable method of selecting the image(s) may be used, as desired.

In some cases, menu 138 and/or menu 140 may include an option to preview an image full size on the display. For example, tapping on the touch screen 102 twice in a rapid manner may expand the thumbnail 142 or list item to a full screen preview. Furthermore, it is contemplated that any suitable method of creating a full screen preview may be used, as desired. Once all the desired electronic images are selected, a user may select the "Done" option to store the settings in controller 100 memory.

It is also contemplated that a menu may be provided for selecting a theme or skin for the user interface of the controller 100. A theme typically includes a set of colors, sounds, images, icons, screensavers, and/or background images that are consistent with a specified theme. For example, one illustrative theme may include a Halloween theme, where the set of colors, sounds, images, icons, screensavers, and/or background images that consistent with a Halloween theme. In a theme, the size and locations of the menus, parameter and other features of the user interface are typically not changed. A skin is typically changes the size and locations of the menus, parameter and other features of the user interface. For example, one illustrative skin may include a star wars skin, wherein the size, shape and locations of the menus, parameter and other features of the user interface are changed to reflect a star wars feel. In some illustrative embodiments, one or more themes and/or skins may be uploaded to the controller 100 via the external interface 27 (see FIG. 11), and a menu similar to that shown in FIGS. 17E-17F may be used to select a theme or skin for use by the controller 100.

Having thus described the several embodiments of the present invention, those of skill in the art will readily appreciate that other embodiments may be made and used which fall within the scope of the claims attached hereto. Numerous advantages of the invention covered by this document have been set forth in the foregoing description. It will be understood that this disclosure is, in many respects, only illustrative. Changes can be made with respect to various elements described herein without exceeding the scope of the invention.

What is claimed is:

1. A programmable thermostat for controlling a climate control system of a building, the programmable thermostat comprising:
    a housing that is configured to house a communication interface, a programmable controller, and a user interface;
    wherein the communication interface is configured to establish communication with an external data source to enable the upload of an electronic image file from the external data source to the thermostat, wherein the electronic image file stores a digital still photographic image;
    wherein the programmable controller is configured to create and/or change a schedule for operating at least part of the climate control system, and to generate control signals for controlling at least part of the climate control system, wherein the programmable controller includes a memory that receives the electronic image file uploaded via the communication interface; and
    wherein the user interface is configured for interacting with a user of the thermostat, the user interface comprising a display having a display area, the display responsive to the programmable controller and for displaying one or more thermostat parameter and for displaying the digital still photographic image uploaded from the external data source, wherein the digital still photographic image covers greater than 25% of the display area, and wherein the programmable controller automatically displays the digital still photographic image after a time of no user interaction with the user interface of the thermostat.

2. The programmable thermostat of claim 1, wherein the programmable controller is configured to receive a signal from an environmental sensor and to control at least part of the climate control system in response to the signal.

3. The programmable thermostat of claim 1 wherein the programmable controller causes the digital still photographic image to be displayed on the display without requiring prompting by a user of the thermostat to do so.

4. The programmable thermostat of claim 1 wherein the programmable controller causes the digital still photographic image to be displayed as a background image on the display with one or more thermostat parameters displayed on top of at least parts of the digital still photographic image.

5. The programmable thermostat of claim 1, wherein the programmable controller is configured to simultaneously display the digital still photographic image and at least one thermostat parameter.

6. The programmable thermostat of claim 1 wherein the digital still photographic image covers all of the display area of the display.

7. The programmable thermostat of claim 2, wherein the environmental sensor is positioned in the housing.

8. A programmable thermostat for controlling a climate control system of a building, the programmable thermostat comprising:
    a housing;
    a communication interface, a programmable controller, a temperature sensor, and a user interface housed by the housing;
    wherein the communication interface is configured to establish communication with an external data source to enable the upload of an electronic image file from the external data source to the thermostat, wherein the electronic image file stores a digital still photographic image;
    wherein the programmable controller is configured to create and/or change a schedule for operating at least part of the climate control system, and to generate control signals for controlling at least part of the climate control system;
    wherein the temperature sensor is in operative communication with the programmable controller, the temperature sensor configured to sense a temperature that is used by the programmable controller to control at least part of the climate control system; and
    wherein the user interface is configured for interacting with a user of the thermostat, the user interface comprising a display having a display area, the display responsive to the programmable controller and displaying one or more thermostat parameter and displaying the digital still photographic image uploaded from the external data source, wherein the digital still photographic image covers greater than 25% of the display area.

9. The programmable thermostat of claim 8 wherein the electronic image file stores a single discrete digital still photographic image for display.

10. The programmable thermostat of claim 8 wherein the programmable controller causes the digital still photographic image to be displayed on the display without requiring prompting by a user of the thermostat to do so.

11. The programmable thermostat of claim 8 wherein the programmable controller automatically displays the digital still photographic image after a time of no user interaction with the user interface of the thermostat.

12. The programmable thermostat of claim 8 wherein the programmable controller causes the display to display the digital still photographic image so as to cover all of the display area.

13. The programmable thermostat of claim 8, wherein the communication interface is configured to establish communication with an external data source to enable the upload of two or more electronic image files from the external data source to the thermostat, wherein the two or more electronic image files each store a digital still photographic image, and wherein the programmable controller causes the display to display the digital still photographic image of each of the two or more electronic image files.

14. The programmable thermostat of claim 13, wherein the programmable controller is configured to cause the display to display the digital still photographic images of each of the two or more electronic image files in sequence.

15. The programmable thermostat of claim 14, wherein the programmable controller is configured to cause the display to display a first digital still photographic image of a first one of the two or more electronic image files for a first period of time, after which the programmable controller causes the display to automatically replace the first digital still photographic image with a second digital still photographic image of a second one of the one or more electronic image files.

16. The programmable thermostat of claim 15, wherein the programmable controller is configured to add a transition effect between the display of the first digital still photographic image and the display of the second digital still photographic image.

17. The programmable thermostat of claim 8, wherein the programmable controller is configured to simultaneously display the digital still photographic image and at least one thermostat parameter on the display.

18. A programmable thermostat for controlling a climate control system of a building, the programmable thermostat comprising:
   a housing;
   a communication interface contained within the housing, the interface configured to communicate with an external data source to enable the upload of an electronic image file from the external data source to the thermostat, wherein the electronic image file stores a digital still photographic image;
   a programmable controller contained within the housing, the programmable controller configured to create and/or change a schedule for operating at least part of the climate control system, and to generate control signals for controlling at least part of the climate control system, wherein the programmable controller includes a memory that receives the electronic image file uploaded via the interface;
   a temperature sensor in operative communication with the programmable controller;
   a user interface contained within the housing but viewable from outside of the housing, the user interface configured for interacting with a user of the thermostat, the user interface comprising a display having a display area, the display responsive to the programmable controller and displaying one or more thermostat parameter and displaying the digital still photographic image uploaded from the external data source, wherein the digital still photographic image covers greater than 25% of the display area; and
   wherein the programmable controller automatically displays the digital still photographic image after a time of no user interaction with the user interface of the thermostat.

19. The programmable thermostat of claim 18 wherein the programmable controller causes the digital still photographic image to be displayed as a background image on the display with one or more thermostat parameters displayed on top of at least parts of the digital still photographic image.

20. The programmable thermostat of claim 18, wherein the programmable controller is configured to simultaneously display the digital still photographic image and at least one thermostat parameter.

21. The programmable thermostat of claim 18 wherein the digital still photographic image, when displayed, covers all of the display area of the display.

* * * * *